US011019516B2

(12) United States Patent
Lala

(10) Patent No.: US 11,019,516 B2
(45) Date of Patent: *May 25, 2021

(54) METHODS AND SYSTEMS FOR MONITORING AN ACCESS NETWORK UTILIZING MOBILE NETWORK EQUIPMENT

(71) Applicant: Viasat, Inc., Carlsbad, CA (US)

(72) Inventor: Sanjay V. Lala, Temecula, CA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/854,726

(22) Filed: Apr. 21, 2020

(65) Prior Publication Data

US 2020/0382977 A1 Dec. 3, 2020

Related U.S. Application Data

(63) Continuation of application No. 15/336,719, filed on Oct. 27, 2016, now Pat. No. 10,659,980.

(Continued)

(51) Int. Cl.
*H04W 24/08* (2009.01)
*H04L 12/24* (2006.01)
(Continued)

(52) U.S. Cl.
CPC ............. *H04W 24/08* (2013.01); *H04L 41/22* (2013.01); *H04L 41/5009* (2013.01);
(Continued)

(58) Field of Classification Search
CPC . H04L 41/22; H04L 41/5009; H04L 43/0894; H04W 24/08; H04W 4/021; H04W 24/04
See application file for complete search history.

(56) References Cited

U.S. PATENT DOCUMENTS 6,571,140 B1  5/2003  Wewalaarachchi et al.
7,734,287 B2  6/2010  Ying
(Continued)

OTHER PUBLICATIONS

Flight Data Services Selects InetSoft's Business Intelligence Softwar. InetSoft Technology. Https://www.inetsoft.com/company/pressr/commerical_aircraft_data_monitoring_servicwe_selects_inetsoft_business_intelligence_software.isp. pp. 1-4. Jan. 25, 2016.

(Continued)

*Primary Examiner* — Philip J Chea
*Assistant Examiner* — Robert B McAdams
(74) *Attorney, Agent, or Firm* — Holland & Hart LLP

(57) ABSTRACT

Methods and systems for monitoring the performance of an access network utilizing mobile network equipment are provided. In some aspects, a network performance monitoring unit is installed within a vessel receiving network service from a network service provider. The network performance monitoring unit measures various aspects of network performance experienced by the vessel as it moves and provides the information to an aggregation facility. The aggregation facility aggregates the network performance data collected from a plurality of vessels and organizes the information based on one or more network service areas associated with the plurality of vessels. By aggregating the vessel specific performance data for vessels associated with a particular network service area, insight into network performance particular to a network service area is improved.

20 Claims, 15 Drawing Sheets

Related U.S. Application Data

(60) Provisional application No. 62/315,898, filed on Mar. 31, 2016, provisional application No. 62/247,550, filed on Oct. 28, 2015.

(51) Int. Cl.
  *H04W 4/021* (2018.01)
  *H04L 12/26* (2006.01)
  *H04W 24/04* (2009.01)

(52) U.S. Cl.
  CPC ......... *H04L 43/0894* (2013.01); *H04W 4/021* (2013.01); *H04W 24/04* (2013.01)

(56) References Cited

U.S. PATENT DOCUMENTS

| | | | |
|---|---|---|---|
| 7,870,080 | B2 | 1/2011 | Budike, Jr. |
| 8,407,576 | B1 | 3/2013 | Yin et al. |
| 8,948,809 | B2 | 2/2015 | Oka et al. |
| 9,065,928 | B2 | 6/2015 | Huang et al. |
| 2004/0225955 | A1 | 11/2004 | Ly |
| 2011/0044177 | A1 | 2/2011 | Nair et al. |
| 2011/0044310 | A1 | 2/2011 | Uhlik |
| 2011/0250883 | A1* | 10/2011 | Pyhtila .............. H04W 24/08 455/424 |
| 2012/0008509 | A1* | 1/2012 | Myers .............. H04W 24/06 370/252 |
| 2012/0196618 | A1* | 8/2012 | Lowell .............. H04W 24/02 455/456.1 |
| 2014/0025440 | A1 | 1/2014 | Nagda et al. |
| 2014/0149836 | A1 | 5/2014 | Bedard et al. |
| 2014/0282046 | A1 | 9/2014 | Gonsalves et al. |
| 2015/0169200 | A1 | 6/2015 | Nicosia |
| 2015/0212717 | A1 | 7/2015 | Nair et al. |

OTHER PUBLICATIONS

Flight Snapshot. Web Based Solutions. FE Personal Editiion. Jan. 25, 2016. pp. 1-2.
IPass Unlimited Service Description. pp. 1-8.
Meraki Cloud Management. Datasheet. Cisco Systems, Inc. pp. 1-6.

* cited by examiner

FIG. 7B

METHODS AND SYSTEMS FOR MONITORING AN ACCESS NETWORK UTILIZING MOBILE NETWORK EQUIPMENT

CROSS REFERENCE TO RELATED APPLICATIONS

The present application for patent is a Continuation of U.S. patent application Ser. No. 15/336,719 filed Oct. 27, 2016, entitled "Methods and Systems For Monitoring An Access Network Utilizing Mobile Network Equipment", which claims priority to U.S. Provisional Application 62/247,550, filed Oct. 28, 2015 and entitled "Mobility Service Dashboard," and to U.S. Provisional Application No. 62/315,898, filed Mar. 31, 2016, and entitled "Mobility Service Dashboard." The content of these prior applications are considered part of this application, and are hereby incorporated by reference in their entirety.

FIELD

Embodiments relate generally to performance measurement of mobile communications systems.

BACKGROUND

Traditionally, high performance networks, such as broadband networks, were available only in fixed locations with access to substantial infrastructure. These fixed locations had access to technical and financial resources necessary to enable high bandwidth. Later, high performance networks became available in residential environments. More recently, high performance networks are becoming available for mobile platforms, including cell phones, and within transportation devices, such as automobiles, trains, and airplanes. As a result, these high performance networks have become essential to many aspects of daily life.

As high performance networking capabilities have been made available to mobile platforms, managing network performance and user satisfaction for these networks has increased in complexity. Therefore, improved methods of characterizing the performance of mobile network services are needed.

BRIEF SUMMARY

Disclosed are methods and systems for monitoring performance of network services provided to mobile network service consumers. In some aspects, the disclosed methods and systems display network performance information for one or more network service areas. The network service area performance information may be based, in some aspects, on an aggregation of performance data specific to vessels traveling through the network service area. By providing ready access to network service area performance information, more trust and transparency can be created between a network service provider and its customers. The availability of network service area performance information may help to reduce the number of calls made by customers to a network service support center, further increasing customer satisfaction and reducing costs for the network service provider.

The network service area information that is provided may also include indications of the high value being provided by the network service provider. For example, the network service area performance information may indicate the number of customers served, a percentage of time the network was available to customers, a percentage of time service level agreements with the customers were met (service adherence), or other positive indications that the network service provider is delivering a high level of value. Such network service area performance information may also be utilized during customer acquisition, by demonstrating the reliability and performance of a provider's networks.

The network service area performance information may be obtained or derived from vessels (including one or more of vehicles, boats, trains, aircraft, etc) associated with the one or more network service areas, from ground based network elements and data center(s), as well as from satellite (s), vessels, and combinations thereof. For example, in some aspects, as a vessel travels through a network service area, it may collect one or more forward link vessel specific metrics indicating a level of network service available within the network service area to the vessel. For example, the vessel may collect one or more of a service availability measurement, packet loss statistics, delay statistics (such as latency measurements), throughput statistics, and other metrics indicative of network performance experienced by the vessel within the network service area. These one or more vessel specific metrics may be transmitted over one or more communication links between the vessel and an access network, and then to a metrics aggregation data center.

Computers in the metrics aggregation data center may then process the network service area performance information in various ways. For example, the vessel specific metrics associated with a particular network service area may be aggregated with metrics from additional vessels in the network service area to generate one or more metrics representing the overall performance of the network service area, from the perspective of the one or vessels within or associated with the service area. For example, the aggregation of the vessel specific metrics may include determining an average or median value, and/or variance value for the one or more vessel specific metrics. One or more indicator(s) may then be presented for display based on the aggregated value(s).

The aggregated data may be presented in one of at least two forms. In some aspects, the aggregated data may be presented as a dashboard, which may include one or more tables indicating the metrics. For example, in some aspects, a dashboard including indicators of a plurality of network service areas, and indicators of each of the plurality of network service area's performance may be displayed within the table.

In some aspects, the aggregated data may be presented in graphical form. For example, in some aspects, a map of a geographic region may be provided for display on an electronic display. Boundaries of a plurality of network service areas may be displayed at their respective positions on the map. In some aspects, the indicators discussed above may be displayed within boundaries of their respective network service areas. For example, in some aspects, the indicators may be various colors within the boundaries of the network service areas, with different colors corresponding to different levels of performance of the network service within the respective boundaries. For example, green network service areas may indicate nominal network performance in those network service areas, while yellow and red may indicate progressively reduced performance relative to green network service areas. Further, similar indicators may be used to convey the status of performance of the network or components residing in the vessel.

BRIEF DESCRIPTION OF THE DRAWINGS

In the figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

FIG. 7B shows a second version of the exemplary user interface of FIG. 7A.

DETAILED DESCRIPTION

In the following description, numerous specific details are set forth to provide a thorough understanding of the present disclosure. However, one having ordinary skill in the art should recognize that the disclosure can be practiced without these specific details. In some instances, circuits, structures, and techniques have not been shown in detail to avoid obscuring the present disclosure.

Figure 1A:
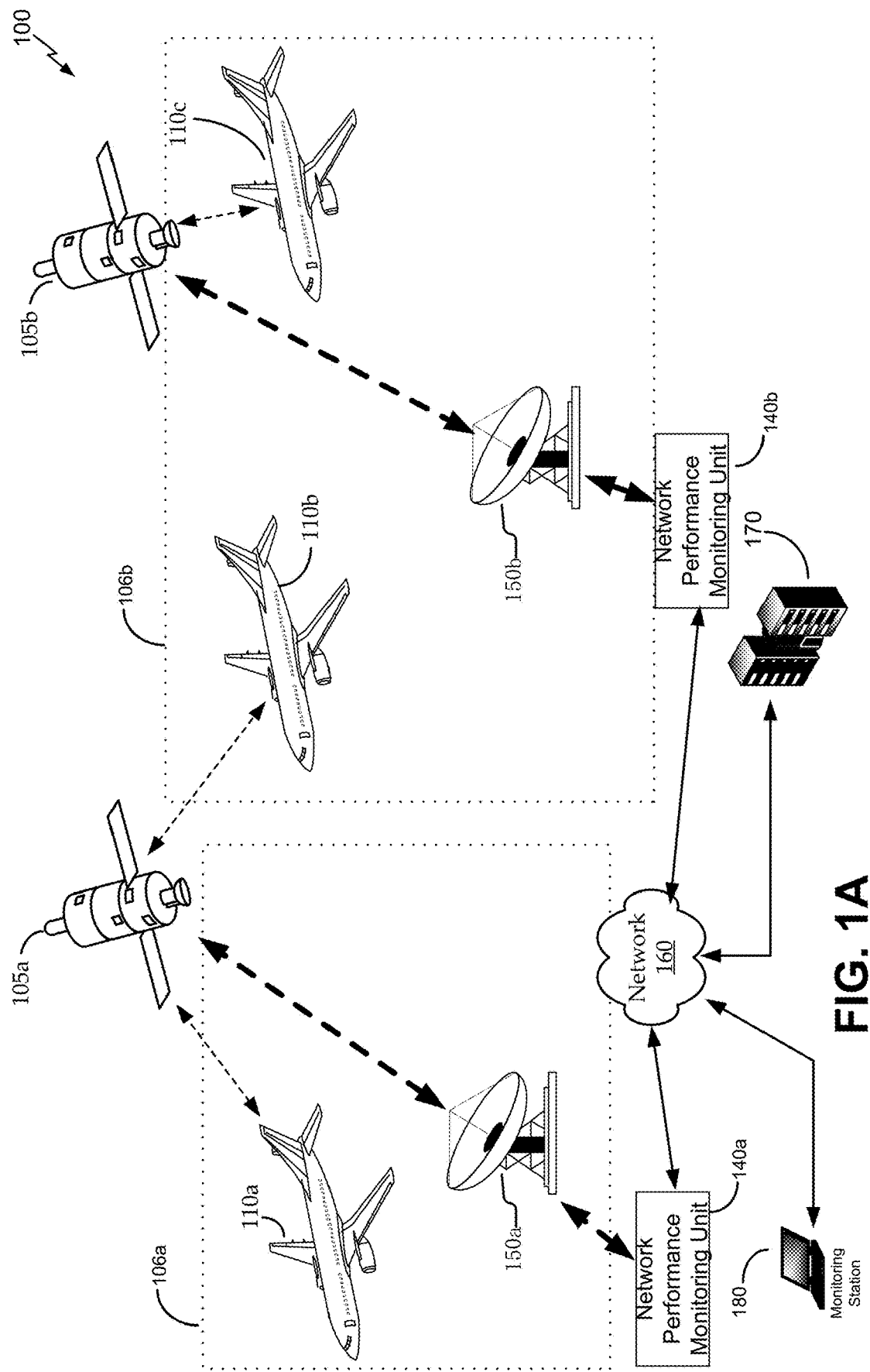
FIG. 1A shows a simplified diagram of a communications system, which provides a context for various embodiments.

FIG. 1A shows a simplified diagram of a communications system 100, which provides a context for various embodiments. Many other configurations are possible having more or fewer components than the communications system 100 of FIG. 1A. In the illustrated embodiment, the communications system 100 includes a plurality of vessels 110a-c, in FIG. 1A shown as airplanes, which are in communication with a terrestrial network 160 via satellites 105a-b, and gateways 150a-b. The vessels 110a-c can include a two-way communication system to facilitate bidirectional communication with each of the respective satellites 105a-b. Each of the vessels 110a-c may be associated with one or more network service areas, shown in FIG. 1A as network service areas 106a-b. In some aspects, the vessels 110a-c may be associated with one or more of the network service areas 106a-b based on a present location of the vessels 110a-c. For example, in some aspects, if a vessel 110a-c is within a geographic region associated with one of the network service areas 106a-b, then the vessel is associated with the one network service area. In some other aspects, a vessel 110a-c may be associated with one or more of the network service areas 106a-b based on origin or destination of the vessel.

Each of the vessels 110a-c are in communication with a data center 170 via the network 160. In some aspects, a network performance monitoring unit 140a and/or 140b may be positioned in the communication path between one or more of the vessels 110a-c and the network 160, so as to monitor return link performance for one or more of the vessels 110a-c.

The data center 170 may include one or more electronic hardware computers, discussed below. The vessels 110a-c may transmit vessel specific performance information indicating one or more characteristics of network performance experienced by the vessel while being serviced by a particular network service area. The vessel specific performance information may flow from the vessels 110a-c, to one of the satellites 105a-b, to one of the gateways 150a-b, to the network 160 and then to the data center 170 and the one or more electronic hardware computers within.

In some aspects, one or more of the vessels 110a-c may include position determination devices, such as an inertial measurement unit (IMU) or global positioning system (GPS). These devices, if installed, may allow the vessel to determine its position. Alternatively, other techniques for determining the vessels position may be used. For example, in embodiments in which the satellite is a spot beam satellite, the vessel may be able to derive its location based on the spot beam being used to communicate with the network 160. The vessel 110a-c may transmit its position information to the data center 170 in some aspects. The position information may be associated with vessel specific metrics that are collected near or at the reported position. This may allow the data center 170 to correlate particular vessel specific metrics with specific network service areas based on the associated position.

The data center 170 may provide a user interface to a monitoring station 180. In some aspects, the monitoring station 180 may be within the data center 170 but in FIG. 1A, the monitoring station 180 is illustrated connecting to the data center 170 via the network 160. The data center may provide a user interface to the monitoring station 180 similar to the example embodiments shown in FIGS. 2, 3, 4, 5, 6A-B, and/or 7A-C discussed below.

In the illustrated embodiment, the vessels 110a-c are airplanes. Alternatively, the vessels 110a-c may be other than an airplane, such as a train, bus, cruise ship, other type of vehicle, etc. As illustrated, the network 160 can be any type of network and can include for example, the Internet, an IP network, an intranet, a wide area network (WAN), local area network (LAN), a virtual private network (VPN), a virtual LAN (VLAN), a fiber optic network, a cable network, a public switched telephone network (PSTN), a public switched data network (PSDN), a public land mobile network, and/or any other type of network supporting communication as described herein. The network 160 can include both wired and wireless connections as well as optical links.

While three vessels 110a-c are shown in communication via two satellites, techniques described herein can be applied in many other communications environments without departing from the scope of the inventions. For example, one or more vessel(s) 110a-c can include airplanes, trains, buses, cruise ships, etc. Any or all such vessel(s) 110 can communicate via any one or more suitable communications architecture(s) including any suitable communications links or access networks, such as satellite communications systems, air-to-ground communication systems, hybrid satellite and air-to-ground communications systems, cellular communications systems, etc. Typically, because of the mobile nature of the vessels 110, the communications architecture will likely involve at least one wireless communications link.

Figure 1B:
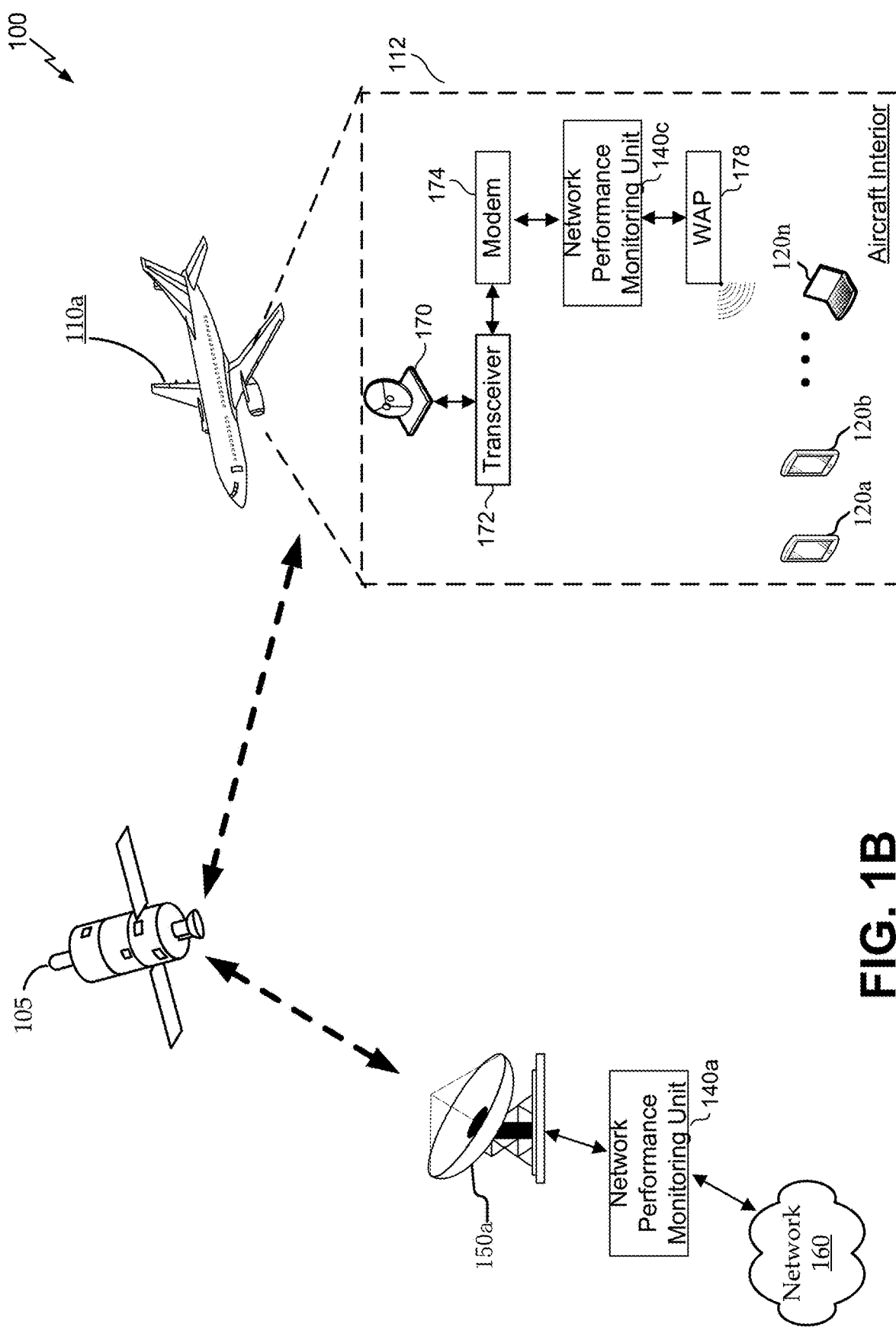
FIG. 1B shows another view of the communications system including a detailed block diagram of one example embodiment of a vessel.

FIG. 1B shows another view of the communications system 100 including a detailed block diagram of one example embodiment of the vessel 110a. The vessel 110a can include a two-way communication system 112 to facilitate bidirectional communication with the satellite 105a. In the illustrated embodiment, the two-way communication system 112 includes an antenna system 170, transceiver 172, modem 174, network performance monitoring unit 140c, wireless access point (WAP) 178, and one or more personal electronic devices 120a-n.

The two-way communication system 112 can provide for reception of a forward downlink signal from the satellite 105 and transmission of a return uplink signal to the satellite 105 to support two-way data communications between personal electronic devices 120 within the transport craft 110 and the terrestrial network 160. The personal electronics devices 120 can include smartphones, laptops, tablets, netbooks, and the like brought onto the transport craft 110 by passengers or crew. As further examples, the personal electronic devices 120 can include passenger seat back systems or other devices on the transport craft 110, including passenger and/or crew devices. The personal electronic devices 120 can communicate with the network 160 via a communication link that can be wired and/or wireless. The communication link can be, for example, part of a local area network such as a wireless local area network (WLAN) supported by WAP 178. One or more WAPs 178 can be distributed about the transport craft 110, and can, in conjunction with network access unit 140, provide traffic switching and routing functionality; for example, as part of a WLAN extended service set (ESS), etc.

In operation, the network access performance monitoring unit 140c installed within the vessel 110a can provide uplink data received from the personal electronic devices 120 to the modem 174 to generate modulated uplink data (e.g., a transmit intermediate frequency (IF) signal) for delivery to the transceiver 172. The transceiver 172 can upconvert and then amplify the modulated uplink data to generate the return uplink signal for transmission to the satellite 105a via the antenna system 170. Similarly, the transceiver 172 can receive the forward downlink signal from the satellite 105a via the antenna system 170. The transceiver 172 can amplify and downconvert the forward downlink signal to generate modulated downlink data (e.g., a receive IF signal) for demodulation by the modem 174. The demodulated downlink data from the modem 174 can be provided to the network performance monitoring unit 140c for routing to the personal electronic devices 120. The modem 174 can be integrated with the network performance monitoring unit 140c, or can be a separate component in some examples.

The network performance monitoring units 140a-c discussed with respect to FIGS. 1A-B may include, in some aspects, an electronic hardware processor and an electronic hardware memory, and one or more network interfaces. The electronic hardware processor may be configured to perform a variety of functions associated with monitoring the network performance of the communications system 100 with respect to the vessel 110a.

In some aspects, any of the network performance monitoring units 140a-c may be configured to generate vessel specific performance data and transmit the vessel specific performance data over an access network. One or more metrics included in the vessel specific performance data representing the measured performance may be generated by any of the network performance monitoring units 140a-c.

In some aspects, the vessel specific performance data may indicate one or more metrics, the one or more metrics including one or more of a number or average number of dropped packets, average throughput or delays during a time period, an availability of network service during a time period, and a maximum number of personal electronic devices (PEDs) connected. In some aspects, the availability of network service may be represented in some aspects as a percentage of time that network service was available to the network performance monitoring unit 140c. In some aspects, the vessel specific performance data may indicate an availability of one or more of uplink and/or downlink communications.

One or more of the network performance monitoring units 140a-c may be further configured to periodically re-determine one or more of the metrics described above. For example, in some aspects, a moving average of one or more of the metrics may be determined at a periodic interval. In some aspects, one or more of the network performance monitoring units 140a-c may be further configured to periodically report one or more of the metrics to the data center 170. In some aspects, the network performance monitoring units installed on a vessel, such as network performance monitoring unit 140c, may be configured to calculate forward link vessel specific performance data, while the network performance monitoring units installed off board the vessels 110a-c, such as network performance monitoring units 140a-b, may be configured to calculate return link vessel specific performance data.

One or more of the network performance monitoring units 140a or 140c may also be configured to monitor a location of the vessel 110a and to periodically report the location of the vessel 110a over the access network to the data center 170, discussed above with respect to FIG. 1A. In some aspects, the network performance monitoring units 140a or 140c may associate one or more of the network performance metrics with one or more vessel 110a locations, and report the association to the data center 170.

In some aspects, one or more of the satellite 105, gateway 150a, or other ground based network equipment (not shown in FIG. 1B) may be configured as the network performance monitoring unit 140a, and thus may generate return link vessel specific performance data. For example, in some aspects, the network performance monitoring unit 140a may be a router, or other type of network equipment, and may be positioned at one end of a communication link providing network communication to a vessel. The router may be configured to determine vessel specific performance data by filtering data transmitted over the communication link to include only data destined for or received from a particular vessel. The router may determine return link vessel specific performance data such as return link latency, throughput, dropped packet count or percentage, retransmission count or percentage, jitter, or other indicators of vessel specific return link performance. In these aspects, the satellite 105, gateway 150a, or other ground based network equipment may be configured to send the vessel specific performance data to the data center 170.

Figure 2:
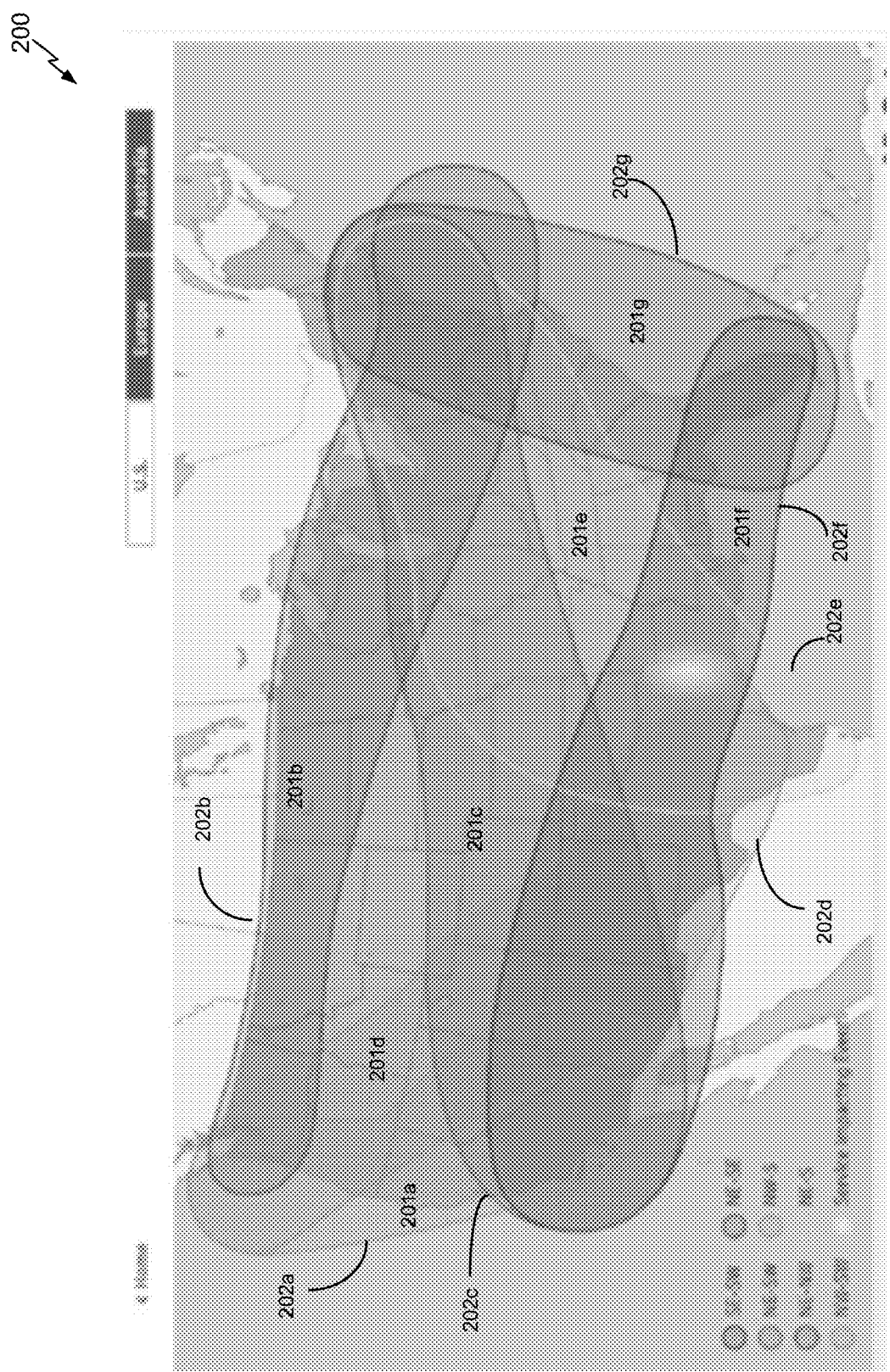
FIG. 2 is an exemplary user interface provided in one embodiment.

FIG. 2 is a user interface provided in an exemplary embodiment. The user interface 200 shows a plurality of network service areas 201a-g. In various embodiments of the user interface shown in FIG. 2, boundaries 202a-g of the plurality of network service areas 201a-g may be either statically or dynamically formed. The dynamically formed boundaries may be formed so as to include vessels with travel paths including common origins and destinations. For example, network service area 201g may include vessels traveling along an eastern corridor of the United States. Network service area 201a may represent a western travel corridor. In some aspects, the boundaries 202a-g may be dynamically determined based on a direction of travel, and/or heading of the vessels, and the vessels positions relative to one another. For example, in some aspects, vessels on a similar heading and within a proximity to each other may be grouped within the same network service area. In some aspects, the grouping may also be determined by a distance from non-grouped vessels exceeding a threshold. The boundaries 202a-g may then be determined so as to include vessels in the same groups.

Figure 3:
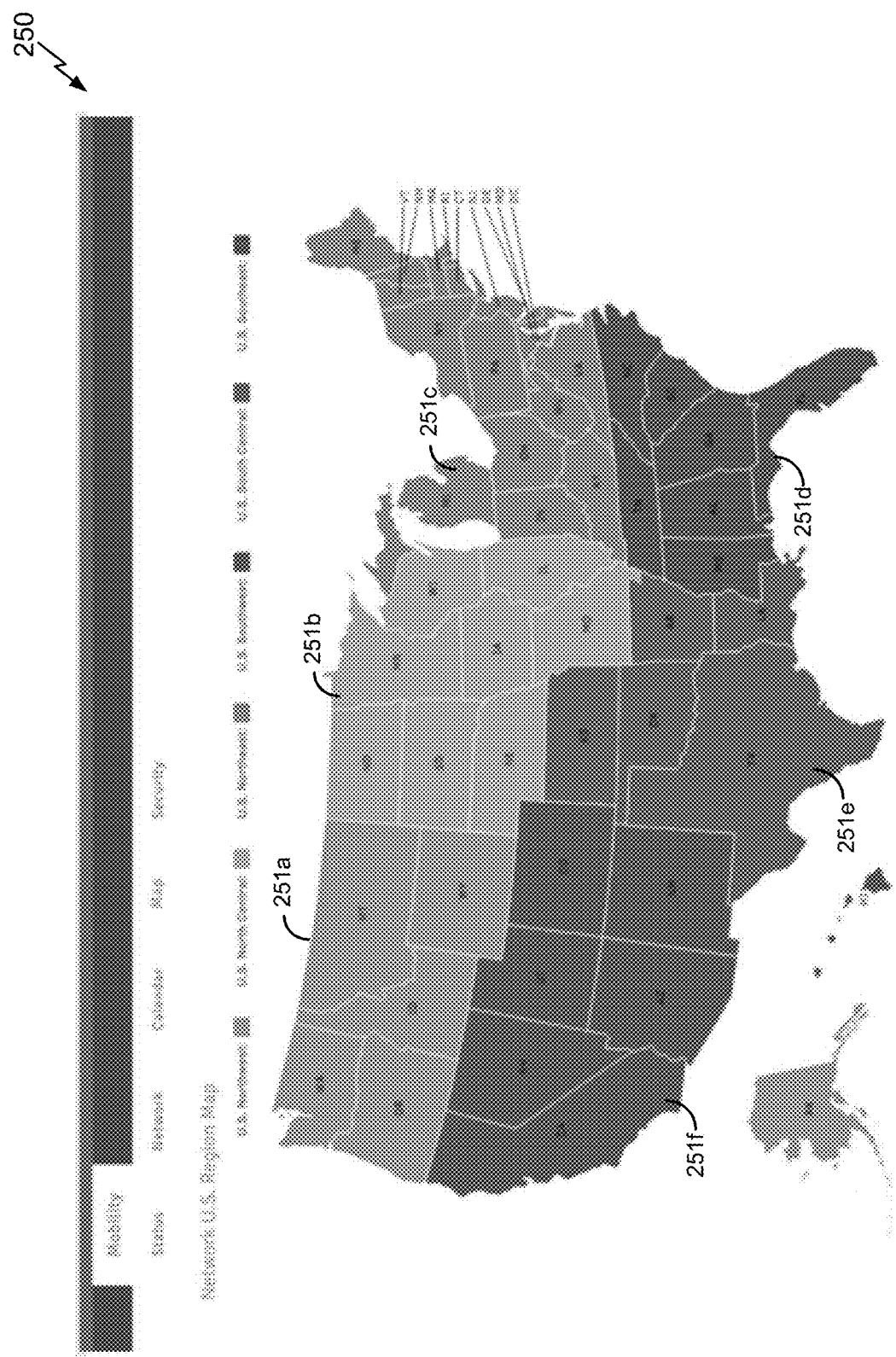
FIG. 3 is an exemplary user interface provided in one embodiment.

FIG. 3 is a user interface displaying exemplary service areas and their associated boundaries. In the aspect shown in FIG. 3, the boundaries of the network services areas 251a-f are static. For example, in some aspects, the boundaries of the service areas 251a-f may be based on governmental jurisdictions, such as city, county, state, or other governmental boundaries.

In some aspects of user interfaces 200 and 250, an indicator of aggregated service performance information for one or more of the network service areas 201a-g and/or 251a-f may be displayed. For example, in some aspects, the indictor may take the form of a color of the network service areas shown in FIGS. 2 and 3. For example, a fill pattern (hashes or dots for example) of the network service areas 201a-g of FIG. 2, or an icon within the network service areas 201a-g of FIG. 2 may indicate the aggregated service performance information. In some embodiments, indications of network availability for each of the network service areas 201a-g and/or 251a-f may be shown using different fill patterns or colors in various embodiments.

Figure 2A:
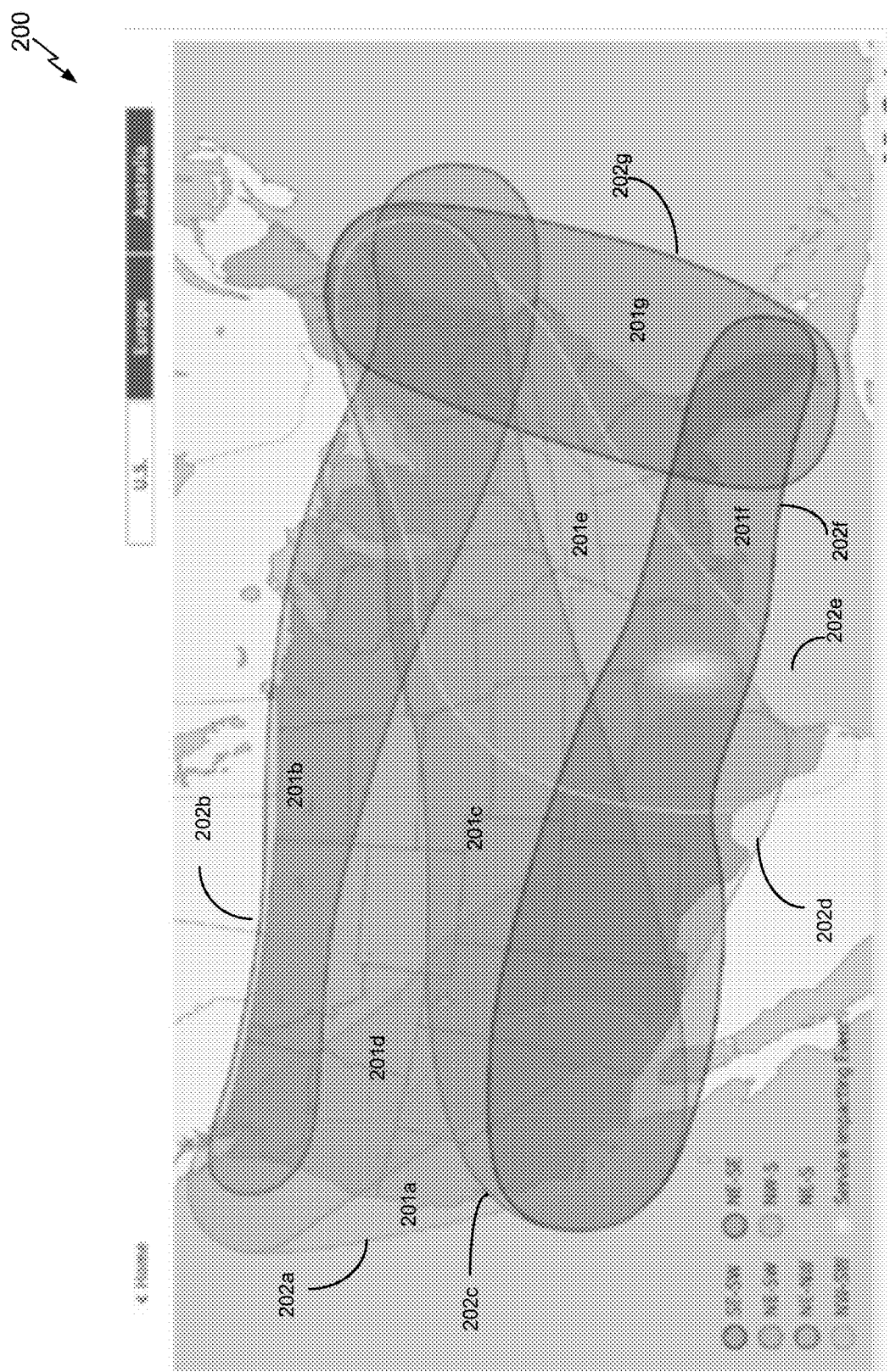
Figure 2B:
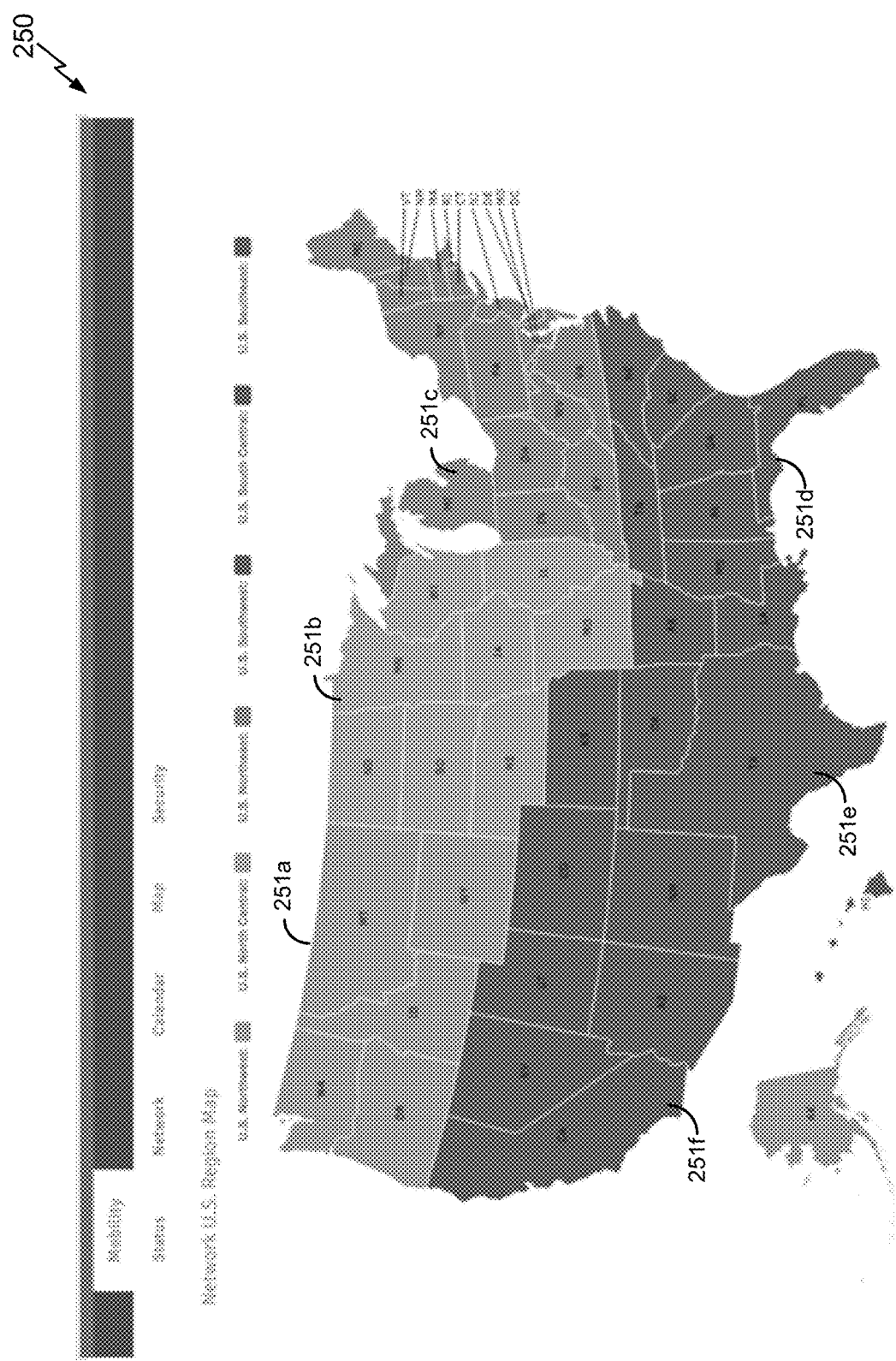

The user interfaces 200 and 250 may facilitate troubleshooting by a network service provider in an environment that incorporates highly mobile network equipment, such as that installed on jet airliners. Without a user interface such as the user interface 200 of FIG. 2A or user interface 250 of FIG. 3, identifying a root cause of some network anomaly reports may be challenging. For example, if a network anomaly is associated with a particular satellite servicing a particular geographic area, network anomaly reports may be received from a variety of aircraft attempting to use the particular satellite. The reports may be received at some time after the anomaly occurs, making it challenging to understand if multiple anomaly reports received from multiple different vessels are in any way related. With interface 200 or 250, by examining performance indicators associated with each of the network service areas 201a-g, or 251a-f, a network operator may be able to determine whether a network performance anomaly is network wide, isolated to one particular network service area, or may be common to two or more (possibly adjacent?) network service areas.

Figure 4:
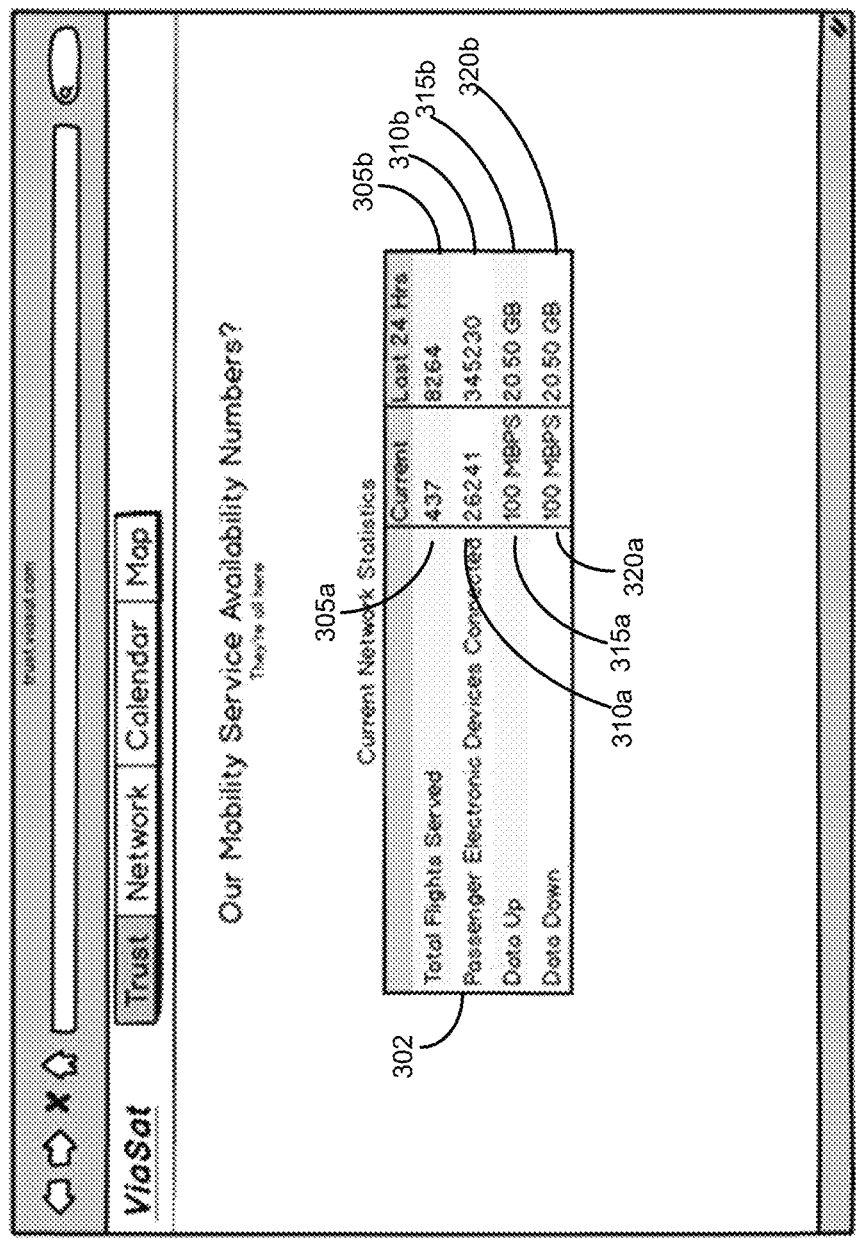
FIG. 4 shows an exemplary embodiment of a user interface provided in some aspects of the disclosed methods and systems.

FIG. 4 shows an exemplary embodiment of a user interface provided in some aspects of the disclosed methods and systems. The user interface 300 of FIG. 4 displays example aggregated service performance information in a table 302. This aggregated service performance information includes a number of flights currently served 305a, a number of flights served within the last 24 hours 305b, a number of passenger electronic devices (PED) connected currently 310a, a number of passenger electronic devices connected within the last 24 hours 310b, an aggregated current data rate for data transmitted in a first direction (in the illustrated embodiment, a current data rate for data transmitted from one or more ground based access networks to airborne vessels) 315a, and an aggregated amount of data transmitted in the first direction (in the illustrated embodiment, an aggregated amount of data transmitted from one or more ground access networks to one or more airborne vessels) 315b, an aggregated data rate for data transmitted in a second direction (in the illustrated embodiment, a rate of data transmitted from one or more airborne vessels to one or more ground access networks), and an aggregated amount of data transmitted in the second direction (in the illustrated embodiment, an aggregated amount of data transmitted from one or more airborne vessels to one or more ground based access networks). As discussed in more detail below, the aggregated service performance information 305a-b, 310a-b, 315a-b, and 320a-b may be determined based on data received from the vessels 110a-c of FIG. 1A.

Figure 5:
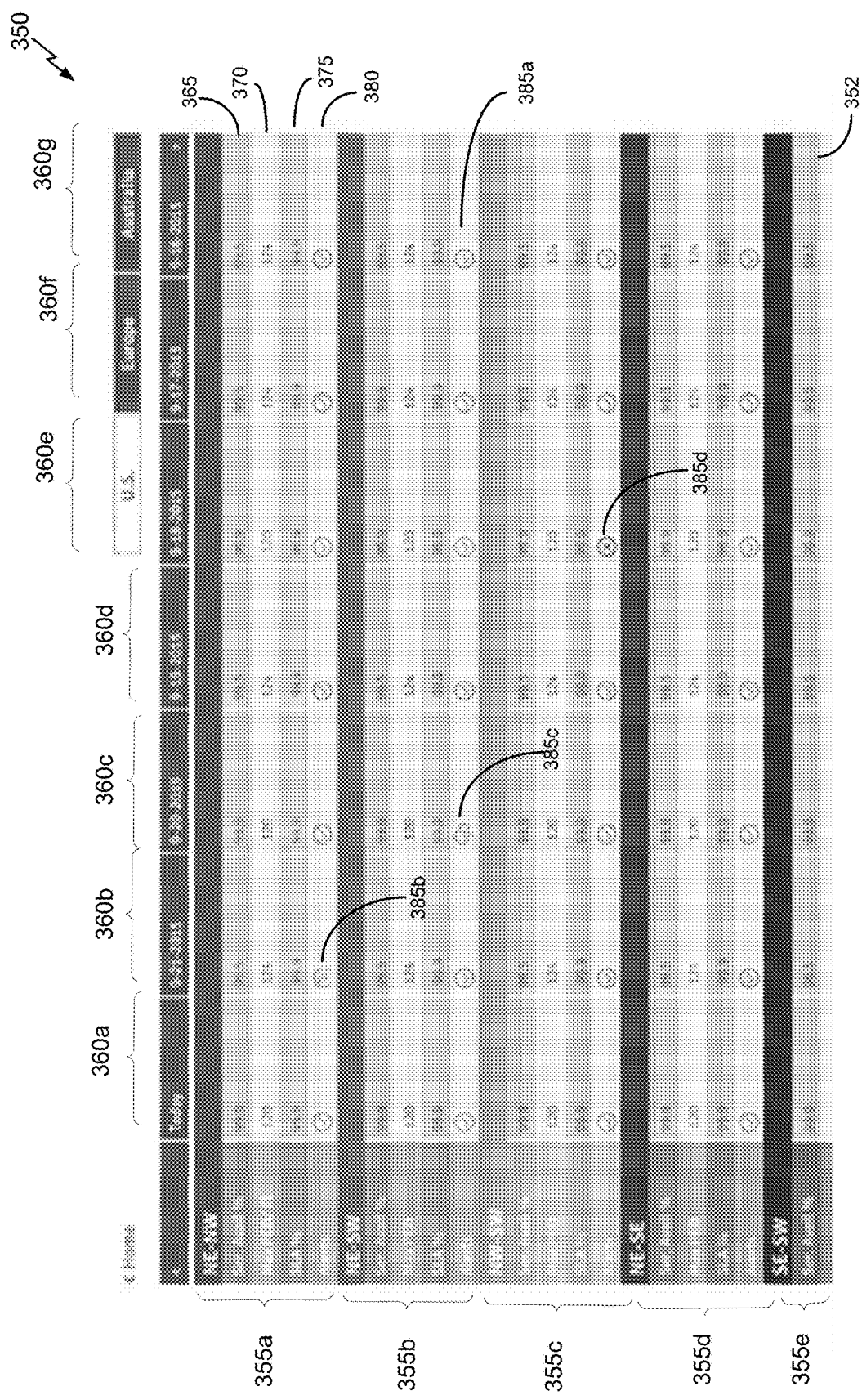
FIG. 5 shows another exemplary embodiment of a user interface provided by some aspects of the disclosed methods and systems.

FIG. 5 shows another exemplary embodiment of a user interface provided by some aspects of the disclosed methods and systems. The user interface 350 displays metrics representing aggregated service performance information for a plurality of network service regions in a table 352 format. The plurality of network service areas 355a-e are individually identified on the left side of the table 352. In the example of FIG. 5, aggregated service performance information for different days are shown in day specific columns 360a-g. Each day includes aggregated service performance information including a service availability percentage 365 of the respective network service area, a maximum number of personal electronic devices 370 connected within the respective service area, a percentage of time when a service level agreement was met (service adherence) 375 by the respective network service area, and an alert indication 380 for the respective network service area. While FIG. 5 shows a service level agreement metric 375, in some aspects, both a forward link service level agreement percentage and/or a return link service level agreement percentage may be displayed. The metrics shown in FIG. 5 may be based on vessel specific performance data for a plurality of vessels within the respective network service area (corresponding to one of network service areas 355a-e).

In some aspects, whether an alert indication 380 is shown for a network service area 355a-e may be based on a value of a metric aggregating performance data specific to vessels associated with the network service area. In some aspects, the values relationship to an alert threshold may be determined by a comparison to the threshold and used to determine whether an alert indication is shown. Several types of alert indicators 380 may be displayed, including a nominal performance indicator 385a, a maintenance alert indicator 385b, a weather alert indicator 385c, an outage alert indictor 385d, and an event indicator 385e.

Figure 6A:
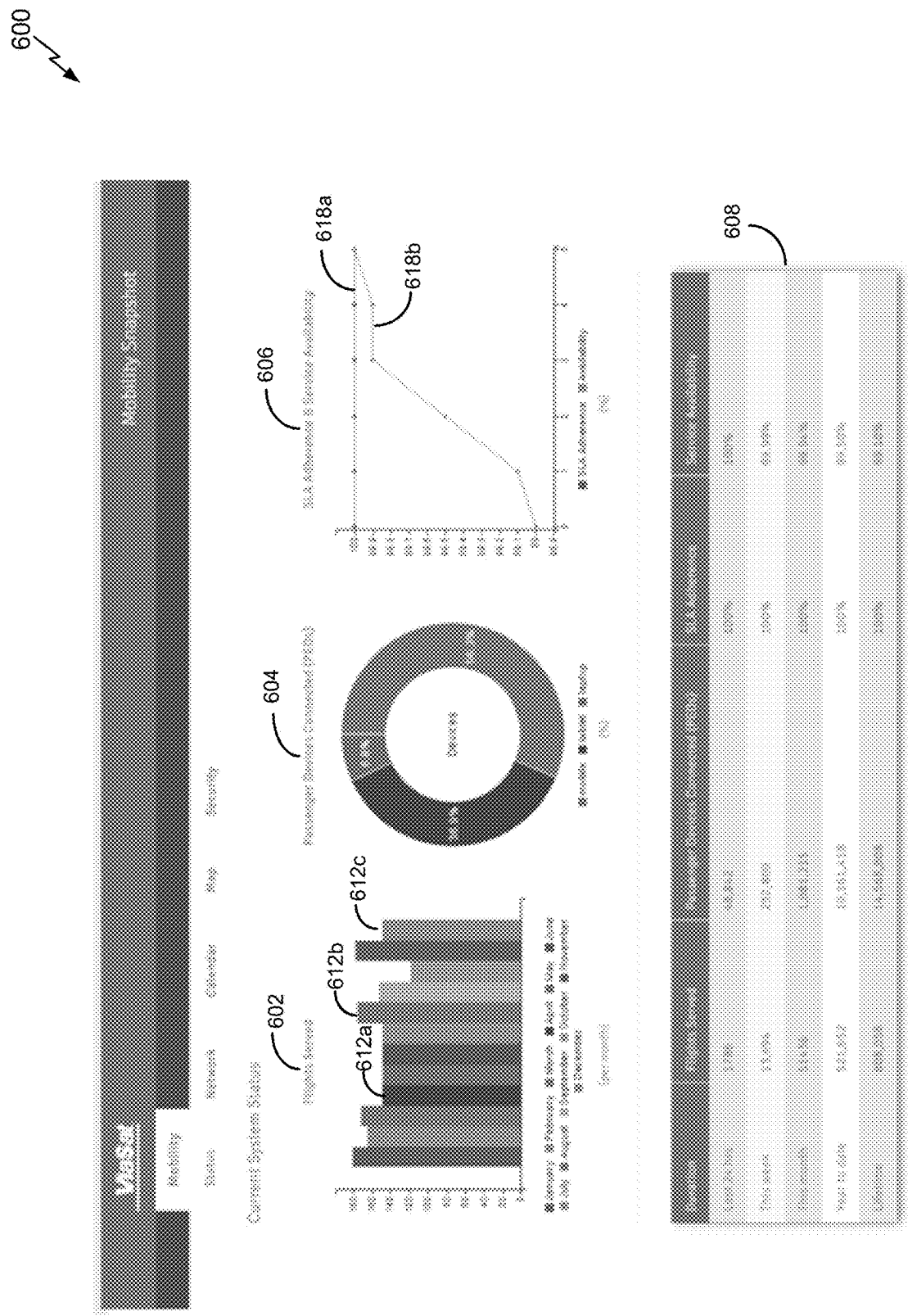
FIG. 6A is an exemplary user interface that may be displayed in at least one of the disclosed embodiments.

FIG. 6A is an exemplary user interface in at least one of the disclosed embodiments. The user interface 600 presents aggregated service performance information for a network service area. The aggregated service performance information may include one or more metrics. The aggregated service performance information may be based on data aggregated from a plurality of vessels operating with the network service area. In the exemplary embodiment of FIG. 6A, the user interface 600 includes a number of flights served indication 602, an indication of the types of devices served 604, an indication of service level agreement (SLA) adherence and service availability 606, and a summary 608 of the indications 602, 604, and 608 over various periods of time, presented in a tabular format.

The indication 602 may present a number of vessels or, in some aspects, flights, served during a period of time by a particular network service area. In some aspects, the period of time may be one hour, one day, one week, or one month. As shown, the period of time is a calendar month. The indication 602 includes a plurality of indications 612a-c for a plurality of time periods. Not all indications are labeled in FIG. 6A to preserve figure clarity.

The indication 604 may be in the form of a pie chart in some aspects, and may display a percentage of devices utilizing the network service that are a particular type. For example, the devices may be characterized in terms of their form factor or classification as mobile, tablet, or laptop in some aspects. Other categorizations are contemplated.

The indication 606 may take the form of a graph in some aspects, as is shown in FIG. 6A. The indication 606 includes two graphs, 618a-b. Graph 618a shows an aggregated service level agreement adherence metric over time. The graph 618a may be based on aggregated data from a plurality of vessels within the service area. The graph 618b shows availability of the network service over the period of time. Whether the network service is available or not may be determined based on one or more aggregated service performance information meeting one or more criteria, as described below with respect to Table 1.

The summary 608 includes aggregated data for a number of flights served, passenger devices connected, an SLA adherence percentage, and a service availability percentage over time periods of one or more of a previous 24 hours, previous week, previous month, year to date, and a lifetime. In some aspects, the lifetime values may represent values accumulated since the service area was first created.

Each of the indications 602, 604, 606, and 608 may be based on service performance information for vessels associated with or within a network service area. This service performance information may be calculated on the vessel itself, for example, via the network performance monitoring unit 140c, or via other network equipment, such as the gateway 150a or network performance monitoring unit 140a. The data from the multiple vessels may then be aggregated to generate one or more of the indications 602, 604, 606, and 608.

Figure 6B:
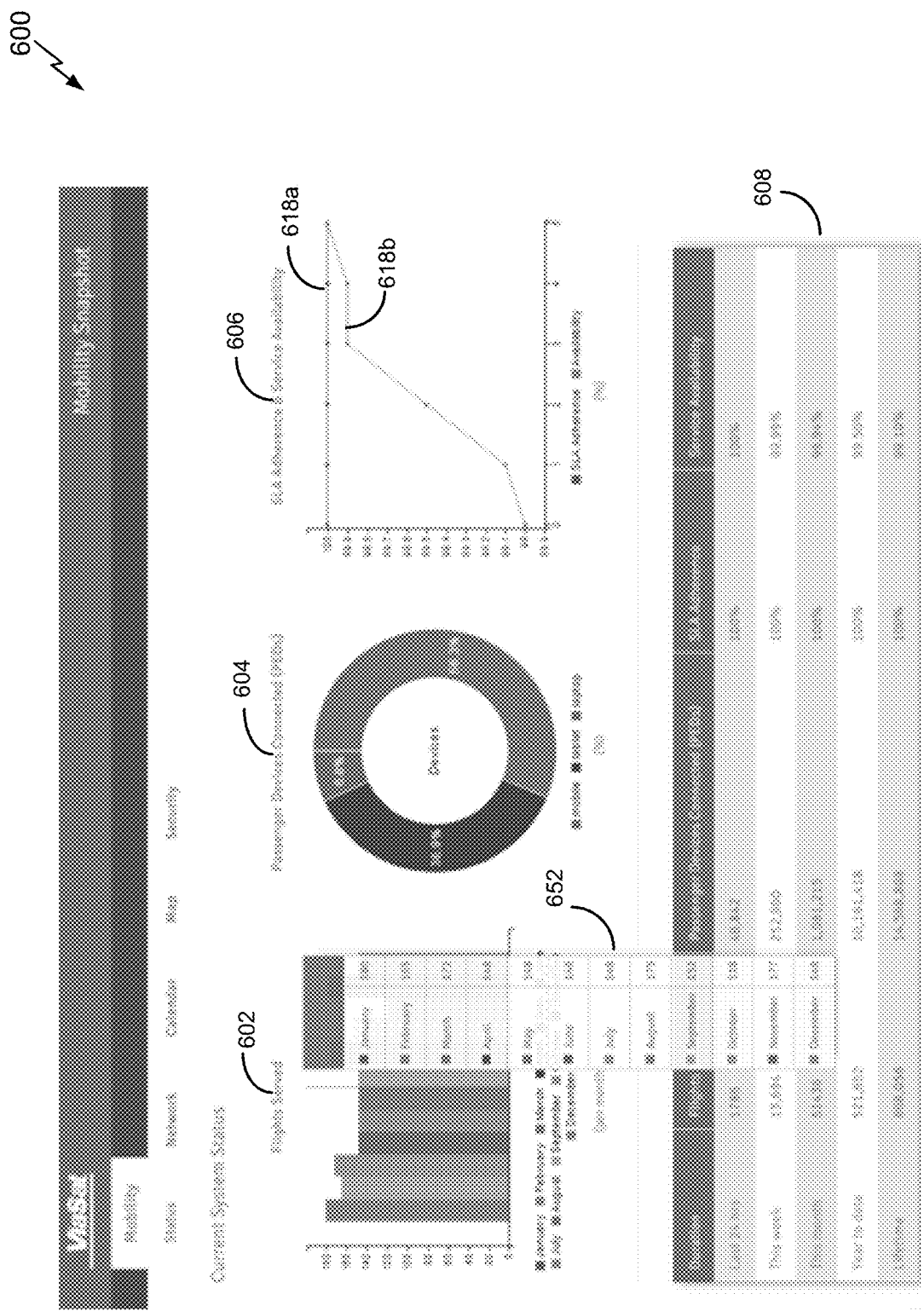
FIG. 6B shows a second version of the user interface of FIG. 6A.

FIG. 6B shows a second version of the user interface 600. The second version of the interface 600 shows an exemplary hover window 652 that may be presented in some aspects when a pointing device is placed over the indication 602. The hover window 652 shows values for each individual time period displayed in the indication 602.

Figure 7A:
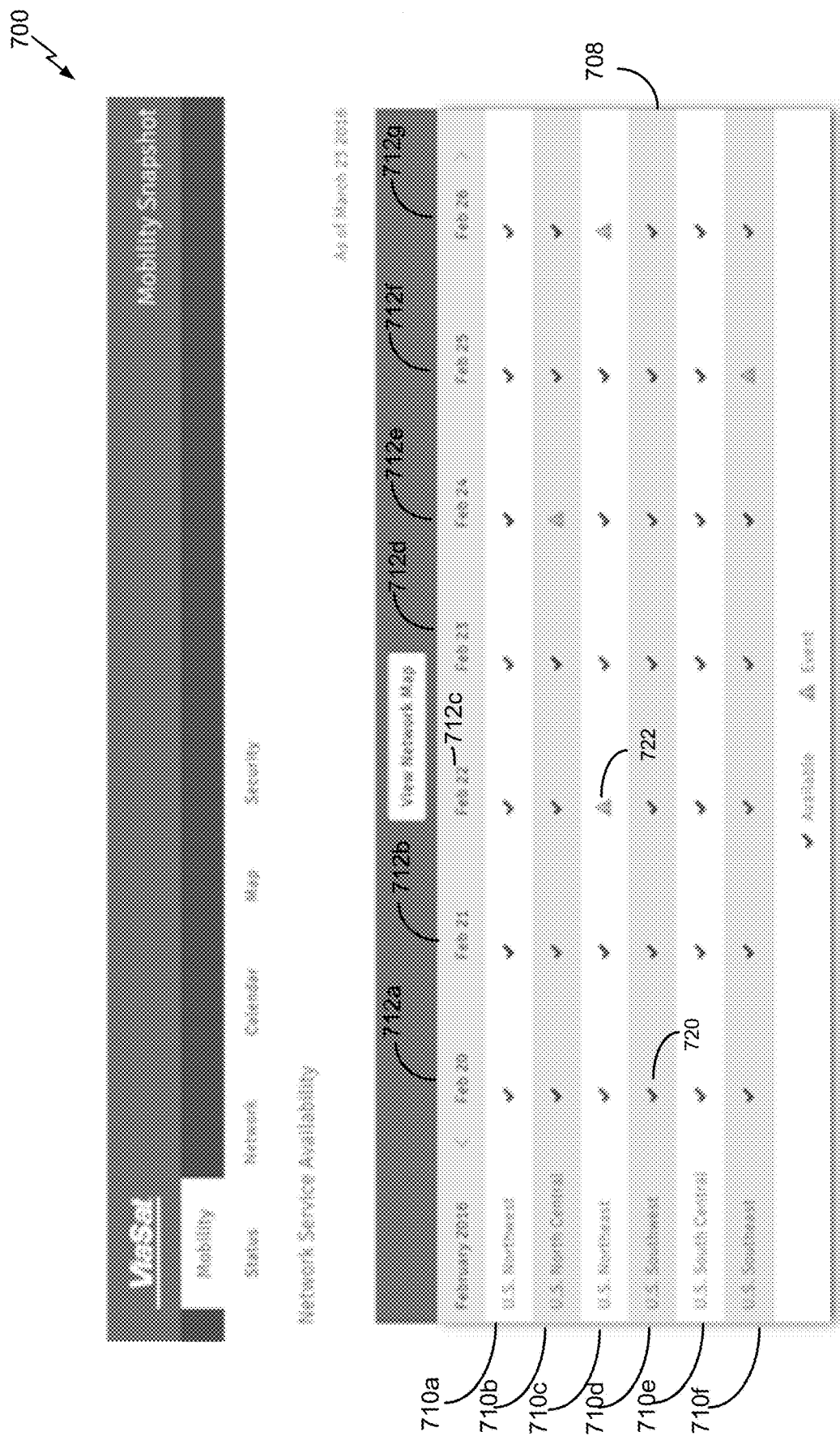
FIG. 7A is an exemplary user interface that may be displayed in at least one of the disclosed embodiments.

FIG. 7A is an exemplary user interface that may be displayed in at least one of the disclosed embodiments. Exemplary user interface 700 presents network service availability information for network services within different geographical regions. The network service availability information is provided for a plurality of geographical regions along the rows of user interface 700, shown as 710a-f. For each geographical region, aggregated data is provided for a plurality of time periods 712a-g. While exemplary user interface 700 shows the plurality of time periods 712a-g as days, in other aspects the time periods may be minutes, hours, weeks, months, or any time period.

In some aspects, if the aggregated service availability information for a particular region during a particular time period meets a criteria, a first icon may be displayed. If the availability information for the particular region during the particular time period does not meet the criteria, a second icon may be displayed. As shown, when the service availability is acceptable, for example, it is above a threshold percentage of time, a green check mark 720 is displayed. Alternatively, when the service availability does not meet the acceptable criteria (for example, it is equal to or below the threshold percentage of time), a different icon is shown, such as the triangular event icon 722.

Figure 7B:
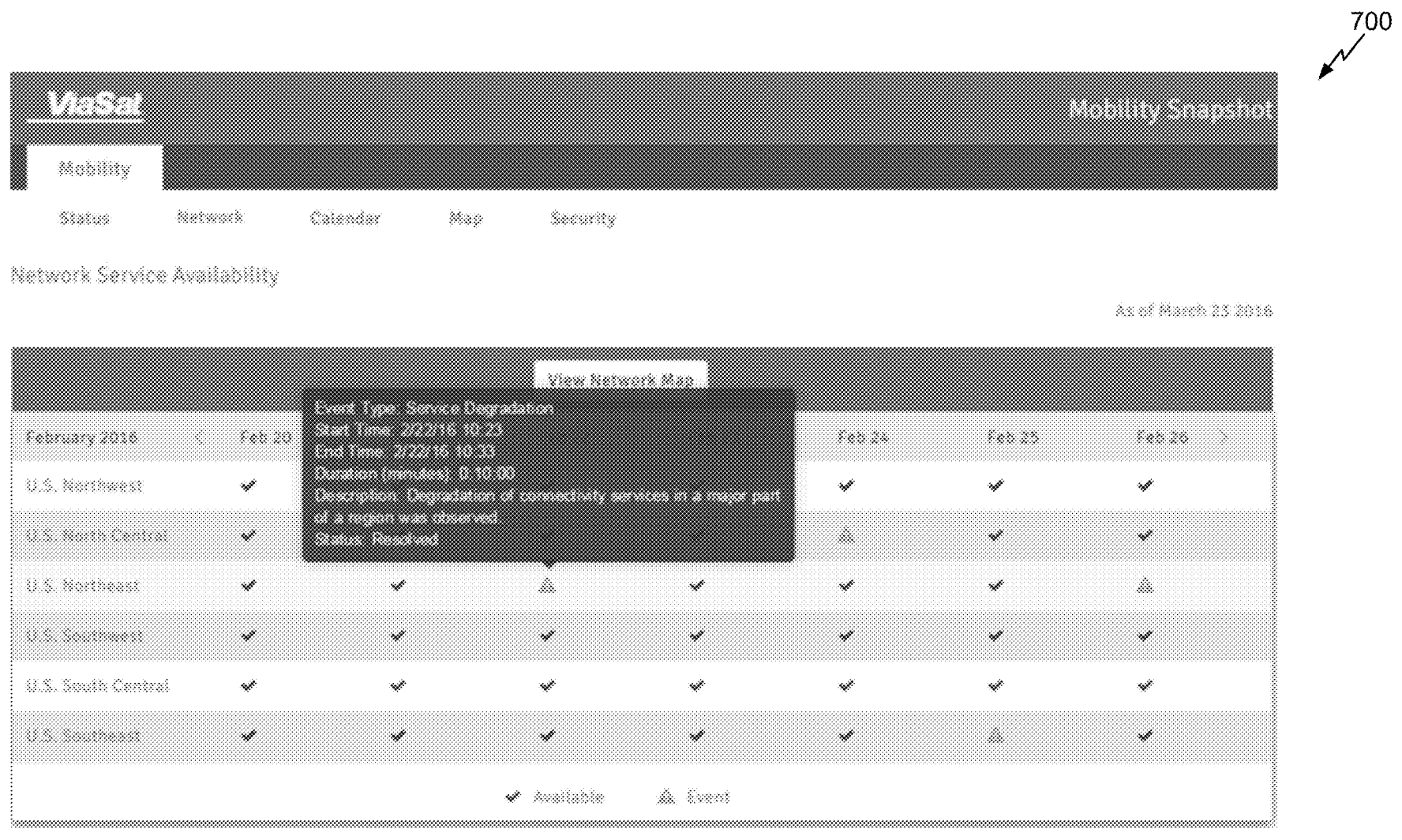

FIG. 7B shows a second version of the exemplary user interface of FIG. 7A. FIG. 7B shows a hover window 752 that may be displayed when a pointing device is placed over a particular triangular event icon 722 of the user interface 700. The hover window 752 may display information such as the type of event, a start time of the event, and end time of the event, a duration of the event, a description of the event, and a current status of the event.

Figure 7C:
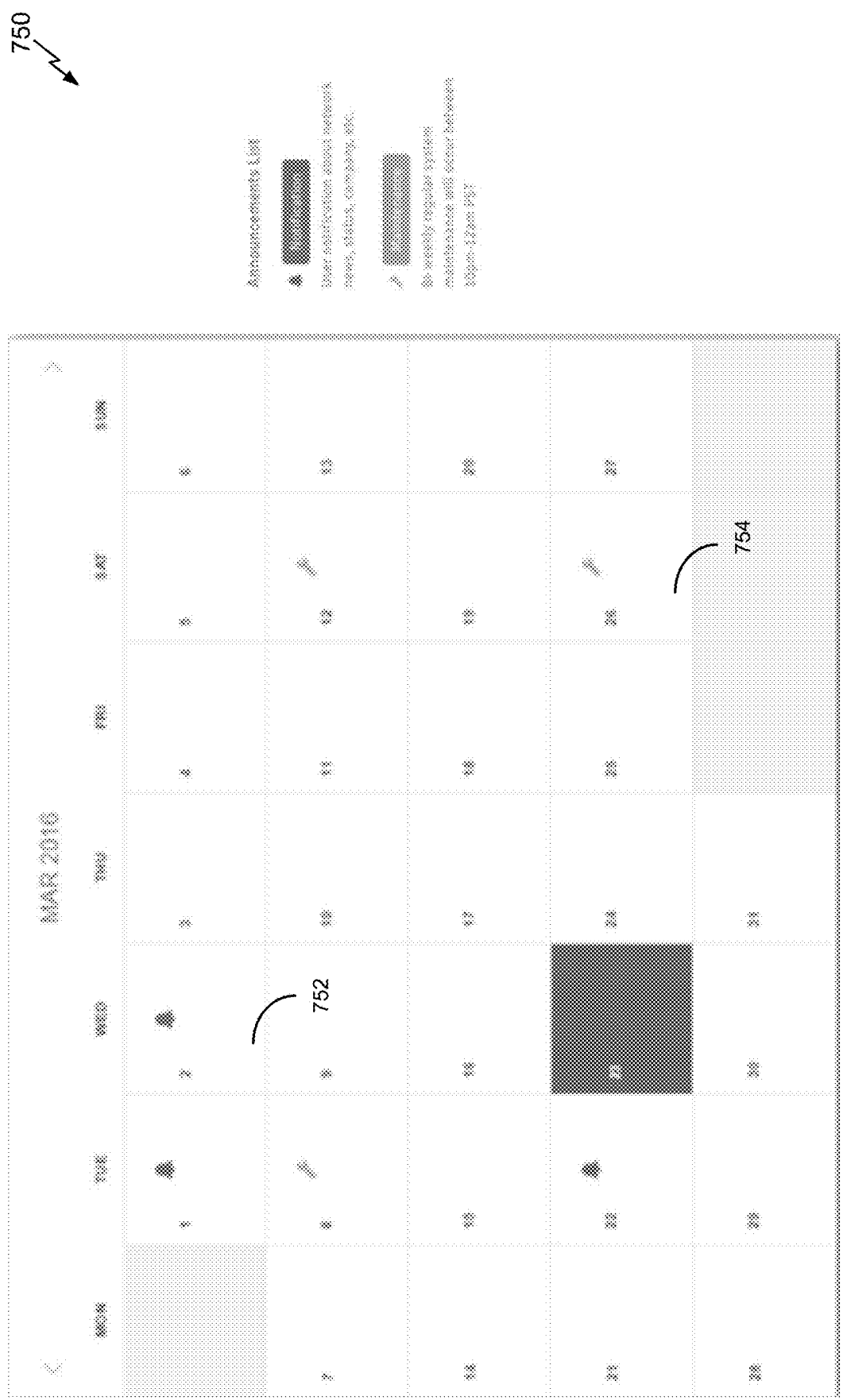
FIG. 7C shows an exemplary user interface that may be displayed in at least one of the disclosed embodiments.

FIG. 7C shows an exemplary user interface that may be displayed in at least one of the disclosed embodiments. FIG. 7C shows one embodiment of a maintenance calendar 750. The methods and systems disclosed may display one or more icons on the maintenance calendar 750 to indicate one or more events on a particular day. For example, as shown, a notification icon 752 may be displayed to indicate a user notification about network news, status, the company providing the network service, or other information. A maintenance icon 754 may be displayed on some days to indicate maintenance may be performed on the network service on that day.

Figure 8:
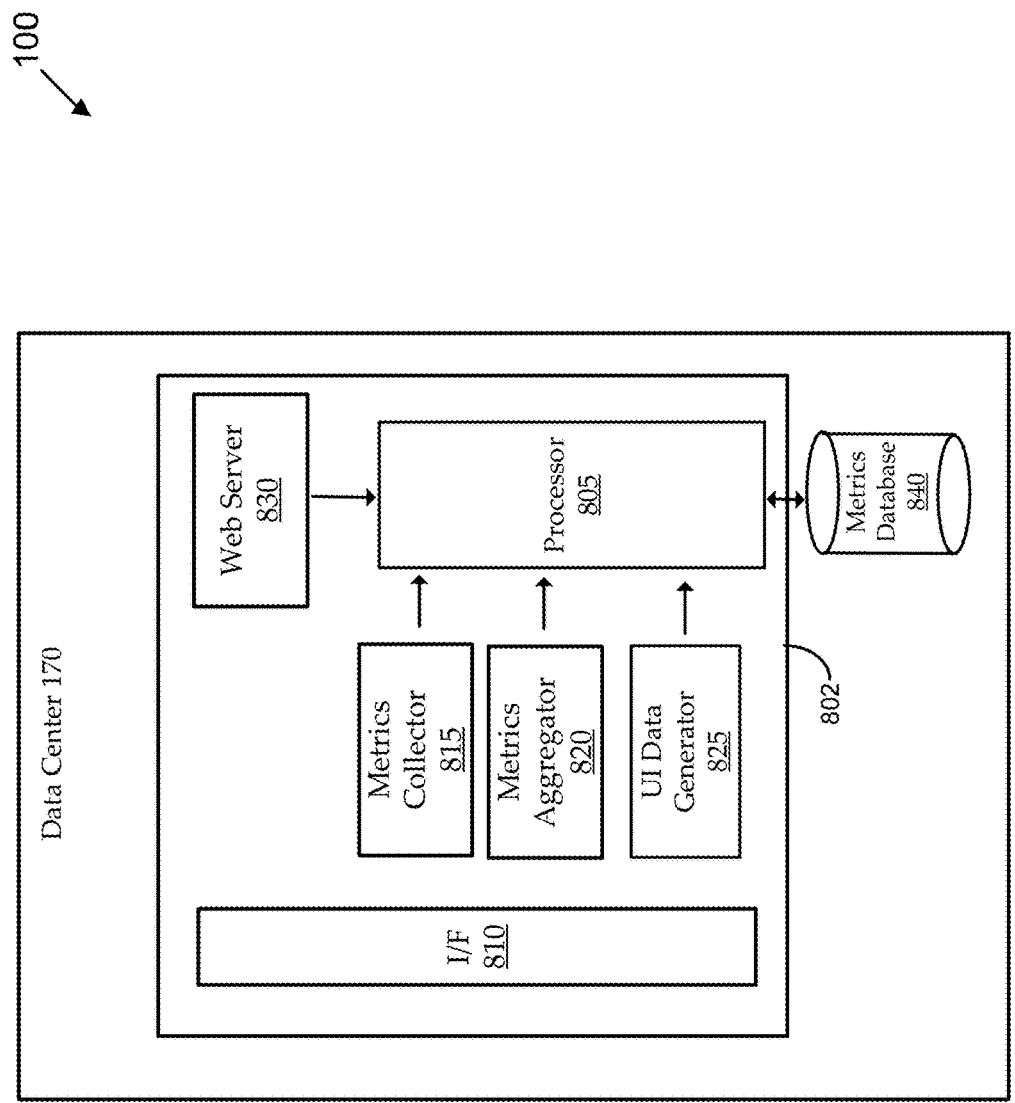
FIG. 8 shows another view of a communications system including a detailed block diagram of one example embodiment of a data center.
Figure 8:
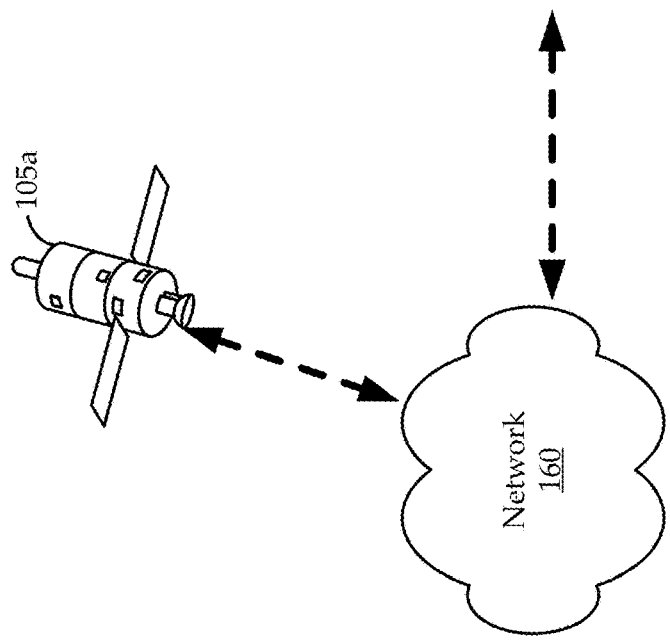

FIG. 8 shows another view of the communications system 100 including a detailed block diagram of one example embodiment of the data center 170. Many other configurations of the data center 170 are possible having more or fewer components. As shown in FIG. 8, the data center 170 includes at least one hardware computer 802. In some aspects, the hardware computer 802 may be comprised of multiple physical computers, which may be geographically distributed across a wide area and connected via a network. In some aspects, the hardware computer 802 may be a single hardware computer contained within a single physical enclosure. In some aspects, the hardware computer 802 may be comprised of multiple physical enclosures, some of which are within the data center 170 and some of which are geographically distributed away from the data center 170. Additionally, the functionalities described with respect to the hardware computer 802 can be distributed among the components in a different manner than described herein.

Consistent with FIGS. 1A-B, in some embodiments, vessel specific performance data for one or more vessels may be received by the satellite 105a for example, and then received by the data center 170 and the electronic hardware computer 802 within the data center 170. The illustrated aspect of the electronic hardware computer 802 includes an electronic hardware processor 805, and a network interface 810. The processor 805 may be in communication with the network interface 810 via an electronic bus within the electronic hardware computer 802 (not shown). The processor 805 may communicate with the network interface 810 to transmit and/or receive packets over a network, such as a network providing connectivity to the vessels 110a-c discussed above with respect to FIG. 1A.

The electronic hardware computer 802 also includes a metrics collector 815, metrics aggregator 820, a UI data generator 825, and a web server 830. The metrics collector 815, metrics aggregator 820, UI data generator 425, and web server 830 may be portions of a volatile or stable storage, such as a virtual or physical memory space accessible to processor 805. The metrics collector 815, metrics aggregator 820, UI data generator 825, and the web server 430 may include binary data defining instructions that configure the processor 805 to perform various functions. For example, the metrics collector 815 may include instructions that configure the processor 805 to receive vessel specific performance data for a plurality of communication links between an access network and a corresponding plurality of vessels. For example, the metrics collector 815 may receive one or more network messages transmitted by one or more of the network performance monitoring units 140a-c, discussed above with respect to FIGS. 1A-B. Each of the network messages may indicate forward link and/or return link vessel specific performance data including one or more metrics. In some aspects supporting multiple vessels 110, the metric collector 815 may receive metrics from a plurality of network performance monitoring units 140, for example, data may be received from a network performance monitoring unit 140 installed within each of the vessels.

The metrics aggregator 820 may store instructions that configure the processor 805 to aggregate the vessel specific performance data received by the metrics collector 815 to determine one or more values of aggregate service performance metric(s) associated with the first network service area. In some aspects, the metrics aggregator 820 may aggregate vessel specific performance data for vessels associated with a particular service area to generate the aggregated service performance metric. An individual aggregated service performance metric may be generated by the metrics aggregator for each of a plurality of service areas, based on the vessels associated therewith.

The user interface data generator 825 may include instructions that configure the electronic hardware processor 805 to generate user interface data defining a user interface that can be displayed on the monitoring station 180 shown in FIG. 1A. The UI data generated by the generator 825 may be based on the aggregated metrics produced by the metrics aggregator 820. For example, the user interface data generator 925 may generate data defining the user interface 200, 250, 300, 350, 600, and/or 700 as shown above in FIGS. 2, 3, 4, 5, 6A-B, and 7A-C respectively. The web server 830 may include instructions that configure the processor 805 to provide data generated by the UI data generator 825 over an access network to the monitoring station 180 shown in FIG. 1A. For example, in response to receiving the data from the web server 430, the monitoring station 180 may display the user interface 200, 250, 300, 350, 600, or 700 as shown above in FIG. 2, 3, 4, 5, 6A-B, or 7A-C.

Figure 9:
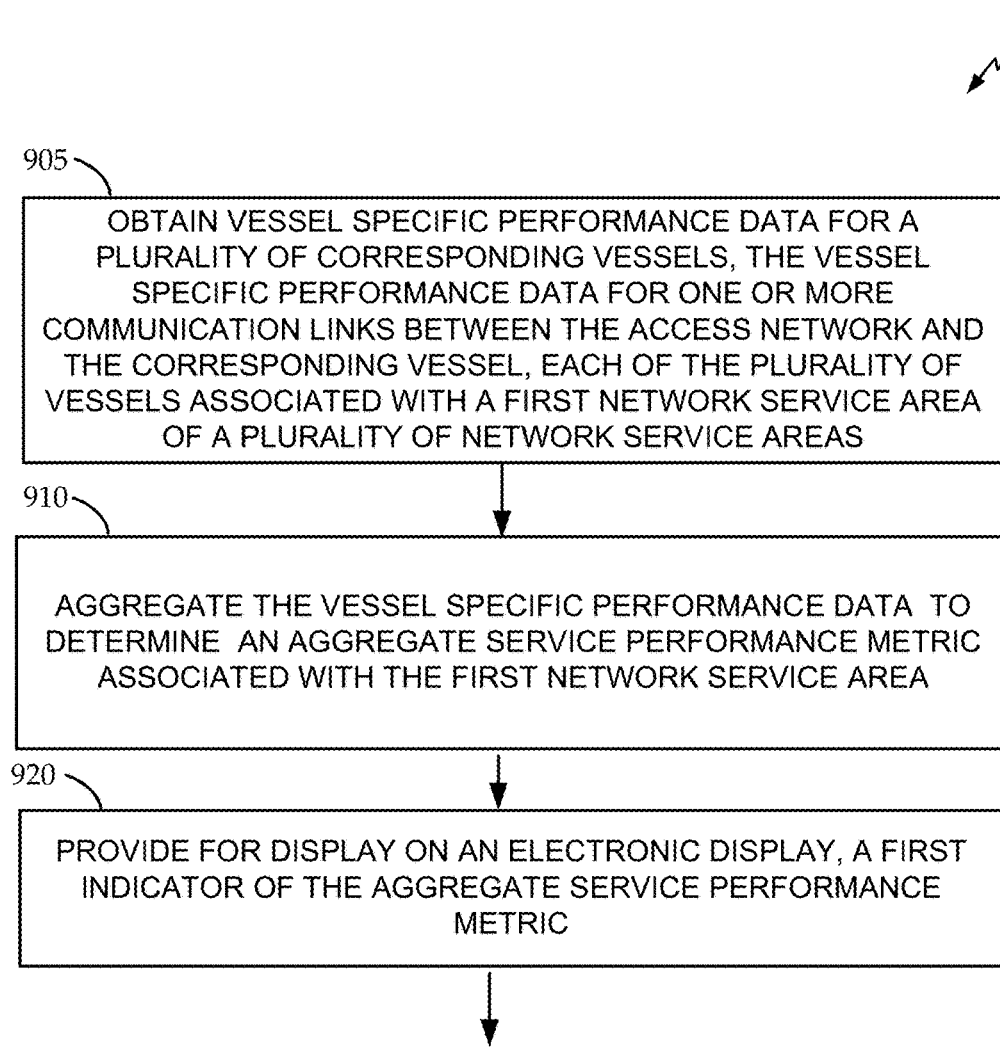
FIG. 9 is a flowchart of a method for monitoring the performance of network equipment providing network communication to vessels traveling within a plurality of network service areas of an access network.

FIG. 9 is a flowchart of a method for monitoring the performance of network services to vessels traveling within a plurality of network service areas of an access network. In some aspects, one or more of the functions discussed below with respect to process 900 and FIG. 9 may be performed by the processor 805, configured by instructions stored in one or more of the metrics collector 815, metrics aggregator 820, UI data generator 825, and/or web server 830.

In various aspects, the vessels may be one or more of airplanes, trains, automobiles, trucks, ships, and motorcycles. In some aspects, the network services monitored by process 900 may be utilized by portable electronic devices 120, such as cellular phones or tablet computers may be managed by the process of FIG. 9. The access network may incorporate one or more of an IP network, an intranet, a wide area network (WAN), local area network (LAN), a virtual private network (VPN), a virtual LAN (VLAN), a fiber optic network, a cable network, a public switched telephone network (PSTN), a public switched data network (PSDN), a public land mobile network, and/or any other type of network supporting communication as described herein. The access network can include both wired and wireless connections as well as optical links.

In some aspects, at least one of the plurality of network service areas may overlap with at least one other of the plurality of network service areas. For example, in some aspects, one or more of the plurality of network service areas may be defined by groups of vessels with common origin and destinations along travel routes for the vessels. For example, vessels traveling between New York City and Washington D.C. may be associated with a first network service area, while vessels traveling between New York City and Buffalo, N.Y. may be associated with a second network service area. In this example, the first and second network service areas may overlap, at least in a region in proximity to New York City.

In some aspects, the network service areas may not overlap. For example, in some aspects, each of the network service areas may be defined by geographical boundaries, with the geographical boundaries defining non-overlapping geographical areas. As a simple example, in some aspects, the plurality of network service areas may be defined by static governmental boundaries within a geographic region, such as by the boundaries of countries, states, cities, or counties.

In some aspects, geographic boundaries for the plurality of network service areas may be dynamically determined. For example, in some aspects, vessels with similar routes of travel may be grouped into a common network service area. The grouping may be based on a heading and/or direction of travel of each of the vessels in some aspects.

In block 905, vessel specific performance data for each of a plurality of corresponding vessels is obtained. Each of the vessel specific performance data may be for one or more communication links between the access network and the corresponding vessel. In some aspects, the vessel specific performance data is obtained from the metrics database 840, discussed above with respect to FIG. 8. At least a portion of the plurality of vessels may be associated with a first network service area of the plurality of network service areas. The plurality of vessels may be a subset of a second plurality of vessels, with the second plurality of vessels including vessels both associated with and not associated with the first network service area.

In some aspects, block 905 may include receiving network messages from the plurality of vessels. For example, block 905 may include receiving network messages from network performance monitoring units (e.g. 140c) within each of the vessels. Each network message from a particular vessel of the plurality of vessels may indicate at least a portion of vessel specific performance data for a communication link used by the vessel. Block 905 may include decoding the messages and storing the vessel specific performance data in a database, such as the metrics database 840 discussed above with respect to FIG. 8.

In some aspects, block 905 includes filtering the second plurality of vessels based on one or more of a location of each of the vessels, and an origin or destination of the vessels along a travel route of each of the vessels, in order to determine which of the second plurality of vessels are associated with the first network service area, and are thus included in the first plurality of vessels. For example, in some aspects, block 905 includes associating at least a portion of the plurality of vessels with the first service area based on one or more of an origin and destination along a corresponding travel route of the vessels.

In some aspects, block 905 may include associating each of the plurality of vessels with the first service area based on a location of each of the plurality of vessels. For example, the plurality of vessels may each have a location within a geographic region of the first service area. In some aspects, block 905 includes associating each vessel in the second plurality of vessels with one or more of the plurality of service areas based on similar criteria as that discussed above. For example, each vessel in the second plurality of vessels may be associated with one or more of the plurality of network service areas based on one or more of an origin or destination location along a travel route of the corresponding vessel, and/or a location of the vessel.

Some aspects of block 905 include obtaining a location of each of the plurality of vessels. For example, in some aspects, each of the vessels may report its position over an access network to the data center 170 discussed above with respect to FIG. 9. These locations may be stored in a database as they are received. The vessels may be grouped based on the reported location information. For example, in some aspects, vessels moving with similar headings (in similar directions) and in similar locations may be grouped within the same group. In some aspects, vessels moving in generally opposite directions (or directions that are substantially 180 degrees different) and within a similar location (within a proximity of each other) may be grouped. Geographic boundaries of the plurality of network service areas may then be determined based on the groups of vessels. For example, in some aspects, each group determined above may define a network service area. In some aspects, some groups may be aggregated into a common network service area. For example, groups of vessels within a proximity of each other may be further grouped into network service area. In some aspects, groups within a proximity of each other that are also not within a second proximity of another one or more vessels may be grouped into a common network service area. Geographic boundaries of each of the plurality of network service areas may then be determined based on the grouping.

In some aspects, the vessel specific performance data may indicate one or more forward link and/or return link metrics, the one or more metrics including one or more of a number or average number of dropped packets or retransmissions detected within the first network service area, average throughput, latency (delays), and/or jitter during a time period within the first network service area, an availability of a network service within the first network service area during a time period, a number or percentage of packet errors (such as checksum or cyclic redundancy check (CRC) errors) detected within the first network service area, and a maximum number of personal electronic devices (PEDs) connected during travel on the vessel. In some aspects, the availability of network service may be represented in some aspects as a percentage of time that a network service was available to a vessel reporting the vessel specific performance data. In some aspects, the forward link metrics received in block 905 may be determined by a network performance monitoring unit 140c installed within a vessel, whereas the return link metrics received in block 910 may have been determined by a network performance monitoring unit 140a that is off-board the vessel, for example, as shown in FIGS. 1A-B. In some aspects, the network performance monitoring unit 140 may be integrated as part of a gateway 150 or satellite 105 for example. In some aspects, block 905 may be performed by instructions included in the metrics collector 815 of FIG. 8 that configure the processor 805 to perform one or more of the functions described above with respect to block 905.

In block 910, the vessel specific performance data is aggregated to determine a value of an aggregate service performance metric associated with the first network service area. In some aspects, aggregating metrics is equivalent to averaging the metrics or obtaining a median value of the metrics. In some aspects, aggregating metrics may include summing the metrics. In some aspects, block 910 aggregates vessel specific performance data of a common type. For example, dropped packet counts for each vessel with the first network service area may be aggregated. Latency information for all vessels within the network service area may be aggregated separately from dropped packet count data. In some aspects, return link metrics of a particular type are aggregated with forward link metrics of the particular type. In other aspects, return link metrics of the particular type are aggregated separately from forward link metrics of the particular type.

In some aspects, the vessel specific performance data includes a first metric of a first type and a second metric of a second type for each of the plurality of vessels. For example, in some aspects, each of the first metrics may indicate a number of dropped packets, while each of the second metrics may indicate a network availability of the network service for each of the vessels. In some aspects, aggregating the vessel specific performance data includes averaging or finding a median value of both the first metrics and the second metrics separately to determine two different aggregated service performance metrics. Thus, in some aspects, the second aggregated service performance metric may represent an average or median availability of an access network within the first network service area. In some aspects, values of aggregated service performance metrics are determined for multiple network service areas in block 910. Each of the values for the aggregated service performance metrics for the multiple network service areas would be determined based on vessel specific performance data for vessels within each of the individual network service areas.

In some aspects, when aggregating metrics relating to a number of personal electronic devices served on a particular vessel within a service area, the value of the aggregated service performance metric may represent a maximum number of personal electronic devices (PEDs) connected for a flight within the network service area. Aggregating in these aspects may include identifying the maximum number of PEDs across vessels associated with the first network service area.

In some aspects, block 910 may generate one or more aggregated service performance metrics for the first network service area, with each aggregated metric based on, for vessels within the first network service area, one of the vessel specific metrics described above with respect to block 905.

In block 920, a first indicator is provided for display on an electronic display. Providing the first indicator for display may include transmitting data representing the first indicator over a computer network to a device that may directly display the indicator on an electronic display. In some other aspects, providing for display may include writing data representing the indicator over a communications port directly connected to the electronic display. The indicator is based on a value of the aggregate service performance metric determined in block 910.

The first indicator may be provided in response to a comparison of the aggregate service performance metric with a threshold. In some aspects that aggregate vessel specific availability metrics as described above, the threshold may be a network availability threshold. For example, in some aspects, the threshold may be set based on a target or contractual objective for an average network availability. When the aggregated network service availability of vessels within a service area drops below the threshold, the indicator may be provided for display in order to draw attention to the network service area with lower than desired network availability. In some aspects, when the availability drops below a threshold, one or more of the outage indicators or performance degradation indicators illustrated in FIG. 5 may be displayed in some aspects. In some aspects, the performance degradation indicator may be displayed if availability is below a first threshold, and the outage indicator may be displayed if availability is below a second threshold lower than the first threshold.

In aspects that determine multiple aggregated service performance metrics for a network service area as discussed above, multiple indicators may be provided for display. In some aspects, each of the multiple indicators may be provided for display based on a comparison of the respective aggregated service performance metric to a corresponding threshold. In other words, each aggregated service performance metric may have associated with it an individual threshold used for comparison and display of a corresponding indicator.

In some aspects, one or more aggregated service performance metrics may be compared to an individual threshold, with the indicator based on the comparison. For example, in some aspects, separate service level adherence and/or service level availability metrics may be provided for return link and forward link data. Contractual agreements may also define separate forward link and/or return link thresholds for service level availability and/or service level adherence. Block 920 may compare one or more of the forward link metrics to a corresponding forward link threshold to generate the indicator. Block 920 may in addition to or alternatively compare one or more of the return link metrics to a corresponding return link threshold to generate the indicator in some aspects.

In some aspects, block 920 includes providing a map of a geographic region for display on the electronic display. Geographic boundaries for the plurality of network service areas may then be overlaid at their respective positions on the map. An example of this is shown in FIGS. 2 and 3 above. In these embodiments, the indicators discussed above may be displayed on the map at locations associated with the indicators. For example, in embodiments displaying an indicator based on the aggregate vessel specific performance data, the indicator may be displayed within the first network service area on the map, since the value determined in block 910 is based on information from vessels associated with the first network service area. For example, in some aspects, block 920 may present for display, portions of the map corresponding to different network service areas in different colors or fill patterns depending on a value of an aggregate service performance metric for each network service area, as shown in the example of FIGS. 2 and/or 3.

Some aspects of block 920 include providing, for display on the electronic display, a table. For example, at least a portion of a table such as one or more of tables 300 and/or 350 and/or 608, and/or 708 that are shown in FIG. 4, FIG. 5, FIGS. 6A-B, or FIG. 7A-C respectively, may be provided for display in block 920. The plurality of metrics may be provided for display on the electronic display within the table in some aspects. For example, as shown in FIG. 5, in some aspects, a plurality of indicators 380 may be provided for display within the table. Each of the plurality of indicators may correspond to one of the plurality of metrics. Each of the plurality of indicators may be determined in response to comparing the corresponding metric to a threshold.

Some aspects may display indicators for a network service area that are unrelated to the vessel specific performance data obtained from vessels. For example, in some aspects, a database indicating scheduled maintenance for one or more network service areas may be read to determine whether a maintenance alert should be displayed for a particular network service area. In some aspects, a weather database may be consulted to determine if a weather indicator should be presented for display for one or more network service areas. For example, in some aspects, a database maintained by the national weather service may be consulted to determine if there is thunderstorm, rain, or other participation within one or more of the network service areas. A weather indicator may be displayed based on the degree of activity within the region in some aspects.

In some aspects, block 920 includes providing for display at least any portion of any of the user interfaces shown in FIGS. 2, 3, 4, 5, 6A-B, and/or 7A-C. In some aspects, the first indicator may also be provided for display on any of the user interfaces discussed above with respect to FIGS. 2, 3, 4, 5, 6A-B, and/or 7A-C.

Table 1 below provides an exemplary summary of how the metrics generated and displayed by the disclosed systems and methods may be described.

TABLE 1

| (A) Exemplary Vessel Specific Metric (may include RL and FL specific metrics) | (B) Exemplary Definition | (C) Exemplary Calculation | (D) Exemplary Definition of Corresponding Threshold compared to Aggregated Vessel Specific Metrics in some aspects (may have separate RL and FL thresholds) | (E) Exemplary result If aggregated metric is below threshold |
|---|---|---|---|---|
| packet loss | An indication of packets that were not received by an intended recipient. | Failure of intended recipient to acknowledge said packet | A maximum nominal percentage of packet loss | Service not available. |
| packet errors | An indication of packets that failed a packet error check process, such as a checksum, CRC, frame check sequence, or similar. | Calculation of error check value from packet data does not match error detection value included in packet. | A maximum nominal percentage of packet errors | Service not available. |

TABLE 1-continued

| (A) Exemplary Vessel Specific Metric (may include RL and FL specific metrics) | (B) Exemplary Definition | (C) Exemplary Calculation | (D) Exemplary Definition of Corresponding Threshold compared to Aggregated Vessel Specific Metrics in some aspects (may have separate RL and FL thresholds) | (E) Exemplary result If aggregated metric is below threshold |
|---|---|---|---|---|
| retransmissions | A percentage or absolute number of packets that required a retransmission during a time period | Determine a number or percentage of packets transmitted more than once. | A maximum nominal percentage of retransmissions | Service not available. |
| jitter | A measure of performance deviation of the network service experienced by the vessel | See RFC 3550 appendix A section 7. | A maximum nominal jitter | Service not available. |
| throughput | A measurement of an amount of data successfully transmitted from a source to a destination | On the vessel: FL - Bytes transmitted/time RL - bytes received/time Off-vessel would be the opposite | A maximum nominal percentage of packet errors | Service not available. |
| latency | A measurement of an amount of time between a message transmission and its reception by an intended recipient. | Elapsed time between transmission of message and reception of acknowledgment/2. | A maximum nominal latency | Service not available. |
| number of personal electronic devices | A measurement of an amount of devices utilizing the network service on a particular vessel within a time period. | May utilize device station or IP address as unique identifier. In embodiments using dynamic IP address assignment for PEDs on a vessel, count number of IP addresses leases active within a time period. | A minimum nominal number of PEDs | A low number of PEDs may or may not represent a network service availability issue |
| network service availability | A measurement of whether one or more functions of the network service could be performed when attempted. | Attempt to retrieve data from X test sources via network 160. If all attempts succeed, service is available. Otherwise, not available. | A minimum service availability that meets a service level agreement | Network service violates service level agreement or SLA % (375 of FIG. 5 < 100%) |

One or more of the vessel specific metrics listed in column (A) of Table 1 may be obtained in block 905. Block 910 may aggregate, across multiple vessels within a particular network service area, any of the metrics in a single row listed in column (A). As discussed previously, forward link and/or return link versions of any of the metrics listed in column (A) may be aggregated separately from each other or together.

In some aspects, block 920 may compare the aggregated metric of a particular row to the threshold defined in column (D) of table 1. One or more indicators presented for display by block 920 may be based on the result of the comparison between the aggregation of a metric in column (A) and the threshold shown in column (D), with an exemplary result shown in column (E). In some aspects, one or more of the indications displayed by block 920 may be based on columns (D) and/or (E) of Table 1.

In some aspects, block 920 may present for display, indicators of return link and/or forward link throughput metrics as described above in Table 1 to provide items 315*a-b* and 320*a-b* respectively as shown in FIG. 4.

In some aspects, block 920 may present for display, indicators of the maximum number of personal electronic devices as described above in Table 1 to provide row(s) 370 described above with respect to FIG. 5. One or more of the metrics described above in Table 1 may be utilized to provide the service availability percentage data 365 and/or the SLA % data 375 also shown above with respect to FIG. 5. The alerts 380 shown in FIG. 5 may also be presented for display based on one or more of the metrics shown above in Table 1.

In some aspects, block 920 may present for display, indictors 618*a* and/or 618*b* shown in FIGS. 6A-B based on one or more of the metrics shown in Table 1. For example, indicator 618*b* may be based on the network service availability metric (or the network service availability metric aggregated across vessels within a service area) shown in Table 1 above in some aspects. In some aspects, indicator 618*a* may be based on comparing the aggregated network service availability metric generated, in some aspects, by block 910, to the threshold shown in column (D) of Table 1.

In some aspects, process 900 may determine service level agreement metrics, such as indicator 618*a* of FIG. 6B based on at least a portion of the data presented in Table 1 above. In some aspects, additional data, such as at least a portion of that presented in Table 2 below may determine service level agreement metrics such as indicator 618*b* shown in FIG. 6B.

TABLE 2

| (A) Aggregated Metric | (B) SLA Requirement |
|---|---|
| packet loss for a network service | Lower than a packet loss threshold 99.5% of the time. |
| packet errors for a network service | Lower than a packet error threshold 99.5% of the time. |
| retransmissions for a network service | Lower than a retransmission threshold 99.5% of the time. |
| jitter for a network service | Lower than a jitter threshold 99.5% of the time. |
| throughput for a network service | Higher than a throughput threshold 99% of the time. |

TABLE 2-continued

| (A) Aggregated Metric | (B) SLA Requirement |
|---|---|
| latency for a network service | Lower than a latency threshold 99% of the time. |
| number of personal electronic devices for a network service | Higher than a PED threshold 99.5% of the time. |
| network service availability for a network service | Available 99% of the time. |

In some aspects, block 920 may determine a service level agreement (SLA) adherence metric, such as that shown as 618a of FIG. 6B based on one or more of the metrics and SLA requirements shown in Table 2 above. For example, for a particular time period, block 920 may determine whether the SLA requirements for each or at least some of the metrics of Table 2 meet the SLA requirement shown in column (B) of Table 2. In some aspects, if any of the metrics do not meet their SLA requirements, then block 920 may consider the service level agreement unmet for that particular time period. In some other aspects, a number of conditions provided in column B of table 2 may need to be unmet before block 920 determines that the SLA requirements are unmet for that time period.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A system for monitoring performance of an access network comprising a first plurality of network service areas having first boundaries associated with providing service via communication links between respective vessels of a plurality of vessels and the access network, comprising:
    a plurality of network performance monitoring units installed in respective ones of the plurality of vessels, each network performance unit configured to collect vessel specific performance data for a communication link between the vessel and the access network when the vessel is located within a corresponding one of the first plurality of network service areas associated with the communication link, and to transmit the vessel specific performance data to a metrics aggregator;
    the metrics aggregator, configured to:
        assign one or more vessels of the plurality of vessels to respective network service areas of a second plurality of network service areas, wherein second boundaries of the second plurality of network service areas are different than the first boundaries of the first plurality of network service areas;
        obtain the vessel specific performance data from the network performance monitoring units of the one or more vessels assigned to the respective network service areas of the second plurality of network service areas; and
        aggregate the vessel specific performance data for the one or more vessels assigned to the respective network service areas of the second plurality of network service areas to determine aggregate service performance metrics associated with the second plurality of network service areas; and
    an electronic hardware processor, configured to provide for display on an electronic display, indicators of the aggregate service performance metrics.

2. The system of claim 1, further comprising a data generator configured to generate data defining a table, the table indicating the aggregate service performance metrics, wherein the electronic hardware processor is further configured to provide the data defining the table for display on the electronic display.

3. The system of claim 1, further comprising a data generator configured to generate first data defining a geographic map and second data defining the second boundaries for the second plurality of network service areas, wherein the electronic hardware processor is further configured to provide the first data and second data for display on the electronic display.

4. The system of claim 3, wherein the electronic hardware processor is configured to provide the indicators for display at positions on the geographic map within the second boundaries of the second plurality of network service areas.

5. The system of claim 1, further comprising an electronic hardware memory storing instructions implementing the metrics aggregator and the electronic hardware processor, wherein the electronic hardware processor is configured to execute the instructions stored in the electronic hardware memory.

6. The system of claim 1, wherein each of the plurality of network performance monitoring units comprises an electronic hardware processor and an electronic hardware memory storing instructions that configures the electronic hardware processor to collect and transmit the vessel specific performance data.

7. The system of claim 1, wherein the metrics aggregator is further configured to compare the aggregate service performance metrics to a threshold, and the electronic hardware processor is configured to present the indicators for display in response to the comparison.

8. The system of claim 1, wherein at least some of the second plurality of network service areas overlap.

9. The system of claim 1, wherein the second plurality of network service areas do not overlap with each other.

10. The system of claim 1, wherein the second boundaries of the second plurality of network service areas correspond to governmental boundaries.

11. A method of monitoring performance of an access network comprising a first plurality of network service areas having first boundaries associated with providing service via communication links between respective vessels of a plurality of vessels and the access network, comprising:
    assigning one or more vessels of the plurality of vessels to respective network service areas of a second plurality of network service areas, wherein second boundaries of the second plurality of network service areas are different than the first boundaries of the first plurality of network service areas;
    obtaining vessel specific performance data for each vessel of the one or more vessels assigned to the respective network service areas of the second plurality of network service areas, the vessel specific performance data for the each vessel for a communication link between the each vessel and the access network when the each vessel is located within a corresponding one of the first plurality of network service areas associated with the communication link;
    aggregate the vessel specific performance data for the one or more vessels assigned to the respective network service areas of the second plurality of network service areas to determine aggregate service performance metrics associated with the second plurality of network service areas; and
    providing, for display on an electronic display, indicators of the aggregate service performance metrics.

12. The method of claim 11, further comprising:
generating data defining a table, the table indicating the aggregate service performance metrics;
providing the data defining the table for display on the electronic display.

13. The method of claim 11, further comprising:
generating first data defining a geographic map and second data defining the second boundaries for the second plurality of network service areas;
providing the first data and second data for display on the electronic display.

14. The method of claim 13, further comprising:
providing the indicators for display at positions on the geographic map within the second boundaries of the second plurality of network service areas.

15. The method of claim 11, wherein at least some of the second plurality of network service areas overlap.

16. The method of claim 11, wherein the second plurality of network service areas do not overlap with each other.

17. The method of claim 11, wherein the second boundaries of the second plurality of network service areas correspond to governmental boundaries.

18. The method of claim 11, wherein each of the vessels is one of an airplane, a ship, a train, and an automobile.

19. The method of claim 11, wherein each of the plurality of vessels is an aircraft, and the access network is a satellite network.

20. The method of claim 11, further comprising:
comparing each of the aggregate service performance metrics to a service availability threshold; and
providing for display on the electronic display, indicators for at least two of the second plurality of network service areas in response to the corresponding comparison.

* * * * *